US011219884B2

(12) United States Patent
Takeda et al.

(10) Patent No.: US 11,219,884 B2
(45) Date of Patent: *Jan. 11, 2022

(54) CLUSTER SUPPORTED CATALYST AND PRODUCTION METHOD THEREFOR

(71) Applicants: TOYOTA JIDOSHA KABUSHIKI KAISHA, Toyota (JP); GENESIS RESEARCH INSTITUTE, INC., Nagoya (JP)

(72) Inventors: Yoshihiro Takeda, Nagoya (JP); Namiki Toyama, Nagoya (JP); Kazuhiro Egashira, Nagoya (JP); Toshiaki Tanaka, Nagoya (JP); Seitoku Ito, Nagoya (JP)

(73) Assignees: TOYOTA JIDOSHA KABUSHIKI KAISHA, Toyota (JP); GENESIS RESEARCH INSTITUTE, INC., Nagoya (JP)

(*) Notice: Subject to any disclaimer, the term of this patent is extended or adjusted under 35 U.S.C. 154(b) by 766 days.

This patent is subject to a terminal disclaimer.

(21) Appl. No.: 16/066,928

(22) PCT Filed: Dec. 26, 2016

(86) PCT No.: PCT/JP2016/088792
§ 371 (c)(1),
(2) Date: Jun. 28, 2018

(87) PCT Pub. No.: WO2017/115767
PCT Pub. Date: Jul. 6, 2017

(65) Prior Publication Data
US 2019/0001306 A1 Jan. 3, 2019

(51) Int. Cl.
*B01J 37/34* (2006.01)
*B01J 23/72* (2006.01)
(Continued)

(52) U.S. Cl.
CPC .............. *B01J 23/72* (2013.01); *B01D 53/86* (2013.01); *B01J 23/42* (2013.01); *B01J 23/44* (2013.01);
(Continued)

(58) Field of Classification Search
CPC ... B01J 23/72; B01J 29/46; B01J 29/74; B01J 29/44; B01J 37/34; B01J 37/16;
(Continued)

(56) References Cited

U.S. PATENT DOCUMENTS 4,552,855 A 11/1985 Ozin et al.
6,362,123 B1 3/2002 Tsao et al.
(Continued)

FOREIGN PATENT DOCUMENTS

CN 103889577 A 6/2014
JP S59-132940 A 7/1984
(Continued)

OTHER PUBLICATIONS

Machine Translation of JP-2010069415-A (Year: 2010).*
(Continued)

*Primary Examiner* — Haytham Soliman
(74) *Attorney, Agent, or Firm* — Oliff PLC

(57) ABSTRACT

A method for producing a cluster-supporting catalyst, the cluster-supporting catalyst including porous carrier particles that has acid sites, and catalyst metal clusters supported within the pores of the porous carrier particles, includes the following steps: providing a dispersion liquid containing a dispersion medium and the porous carrier particles dispersed in the dispersion medium; and in the dispersion liquid, forming catalyst metal clusters having a positive charge, and supporting the catalyst metal clusters on the acid sites within the pores of the porous carrier particles through an electrostatic interaction.

6 Claims, 19 Drawing Sheets

(51) Int. Cl.

| | |
|---|---|
| *B01D 53/86* | (2006.01) |
| *B01J 23/42* | (2006.01) |
| *B01J 29/46* | (2006.01) |
| *B01J 29/74* | (2006.01) |
| *B01J 29/44* | (2006.01) |
| *B01J 37/16* | (2006.01) |
| *B01J 37/02* | (2006.01) |
| *B01J 29/14* | (2006.01) |
| *B01J 29/10* | (2006.01) |
| *B01J 23/745* | (2006.01) |
| *B01J 29/12* | (2006.01) |
| *B01J 23/44* | (2006.01) |
| *B01J 23/46* | (2006.01) |
| *B01J 23/52* | (2006.01) |
| *B01J 29/40* | (2006.01) |
| *B01J 29/70* | (2006.01) |
| *B01J 37/06* | (2006.01) |
| *B01J 23/74* | (2006.01) |

(52) U.S. Cl.
CPC ............ *B01J 23/464* (2013.01); *B01J 23/52* (2013.01); *B01J 23/745* (2013.01); *B01J 29/106* (2013.01); *B01J 29/126* (2013.01); *B01J 29/146* (2013.01); *B01J 29/40* (2013.01); *B01J 29/44* (2013.01); *B01J 29/46* (2013.01); *B01J 29/70* (2013.01); *B01J 29/7007* (2013.01); *B01J 29/7015* (2013.01); *B01J 29/74* (2013.01); *B01J 37/0203* (2013.01); *B01J 37/0211* (2013.01); *B01J 37/0213* (2013.01); *B01J 37/0221* (2013.01); *B01J 37/06* (2013.01); *B01J 37/16* (2013.01); *B01J 37/34* (2013.01); *B01J 37/346* (2013.01); *B01J 37/347* (2013.01); *B01J 37/349* (2013.01); *B01D 2255/106* (2013.01); *B01D 2255/1021* (2013.01); *B01D 2255/1023* (2013.01); *B01D 2255/1025* (2013.01); *B01D 2255/20761* (2013.01); *B01J 23/74* (2013.01); *B01J 2229/16* (2013.01)

(58) Field of Classification Search
CPC ........................ B01J 37/0211; B01J 37/0213; B01J 37/0203; B01J 29/146; B01J 29/106; B01J 23/745; B01J 29/126; B01J 23/44; B01J 23/464; B01J 23/52; B01J 29/40; B01J 29/70; B01J 29/7007; B01J 29/7015; B01J 37/0221; B01J 37/06; B01J 37/346; B01J 37/347; B01J 37/349; B01J 23/42; B01J 2229/16; B01J 23/74; B01J 29/7415; B01J 29/763; B01J 29/072; B01J 2229/186; B01D 53/86; B01D 2255/1021; B01D 2255/1023; B01D 2255/1025; B01D 2255/106; B01D 2255/20761; Y02E 60/50; H01M 4/9041; H01M 4/9058; H01M 4/9075
USPC .......................................................... 502/5
See application file for complete search history.

(56) References Cited

U.S. PATENT DOCUMENTS

| | | |
|---|---|---|
| 9,150,486 B2 | 10/2015 | Geboers et al. |
| 9,221,038 B2 | 12/2015 | Wanninger et al. |
| 10,576,460 B2 | 3/2020 | Toyama et al. |
| 11,014,073 B2 | 5/2021 | Egashira et al. |
| 2007/0227351 A1 | 10/2007 | Garcia-Martinez |
| 2009/0035852 A1 | 2/2009 | Lopez Quintela et al. |
| 2012/0010453 A1 | 1/2012 | Ohkubo et al. |
| 2013/0281284 A1 | 10/2013 | Matsuo et al. |
| 2014/0303266 A1 | 10/2014 | Hyman |
| 2017/0341063 A1 | 11/2017 | Otto et al. |
| 2021/0077986 A1 | 3/2021 | Takeda et al. |

FOREIGN PATENT DOCUMENTS

| | | |
|---|---|---|
| JP | 2002-224573 A | 8/2002 |
| JP | 2002-534558 A | 10/2002 |
| JP | 2006-212464 A | 8/2006 |
| JP | 2009-507996 A | 2/2009 |
| JP | 2010-69415 A | 4/2010 |
| JP | 2010069415 A * | 4/2010 |
| JP | 2010-105055 A | 5/2010 |
| JP | 2012-148272 A | 8/2012 |
| WO | 91/011501 A1 | 8/1991 |
| WO | 00/40676 A1 | 7/2000 |
| WO | 2010/097108 A1 | 9/2010 |

OTHER PUBLICATIONS

Hashimoto et al. "Fabrication of Gold Nanoparticle-Doped Zeolite L Crystals and Characterization by Optical Microscopy: Laser Ablation- and Crystallization Inclusion-Based Approach." Journal of Physical Chemistry C, vol. 112, No. 39, pp. 15089-15093, 2008.
Yeshchenko et al. "Optical spectra and structure of (ZnAs2)n subnanoclusters fabricated by incorporation into zeolite and laser ablation." Materials Science And Engineering C, Elsevier Science S.A, Ch, vol. 27, No. 5-8, pp. 1364-1367, 2007.
Caliskan et al. "Zeolite confined rhodium (0) nanoclusters as highly active, reusable, and long-lived catalyst in the methanolysis of ammonia-borane." Applied Catalysis B: Environmental, Elsevier, Amsterdam, Nl, vol. 93, No. 3-4, pp. 387-394, 2010.
Gates. "Supported Metal Clusters: Synthesis, Structure, and Catalysis." Chemical Rev, American Chemical Society, US, vol. 95, No. 3, pp. 511-522, 1995.
Sachtler, Wolfgang M. H. "Metal Clusters in Zeolites: An Intriguing Class of Catalysts". Accounts of Chemical Research, vol. 26, pp. 383-387, 1993.
M. Choi et al. "Mercaptosilane-Assisted Synthesis of Metal Clusters within Zeolites and Catalytic Consequences of Encapsulation." Journal of American Chemistry Society, vol. 132, No. 26, Jun. 2010, pp. 9129-9137.
T. Otto et al. "Synthesis of stable monodisperse AuPd, AuPt, and PdPt bimetallic clusters encapsulated within LTA-zeolites." Journal of Catalysis, vol. 342, Oct. 2016, pp. 125-137.
V. Ortalan et al., "Direct imaging of single metal atoms and clusters in the pores of dealuminated HY zeolite." Nature Nanotechnology, vol. 5, No. 7, May 2010, pp. 506-510.
J. Guzman et al. "Supported molecular catalysts: metal complexes and clusters on oxides and zeolites." Dalton Transactions, vol. 17, 2003, pp. 3303-3318.
N.G. Semaltianos. "Nanoparticles by Laser Ablation of Bulk Target Materials in Liquids." Handbook of Nanoparticles, 2016, pp. 67-92.
J.C. Fierro-Gonzalez et al. "Gold Nanoclusters Entrapped in the a-Cages of Y zeolites: Structural Characterization by X-ray Absorption Spectroscopy." The Journal of Physical Chemistry C, vol. 111, No. 18, Apr. 2007, pp. 6645-6651.
A.J. Liang et al. "Time-Resolved Structural Characterization of Formation and Break-up of Rhodium Clusters Supported in Highly Dealuminated Y Zeolite." The Journal of Physical Chemistry C, vol. 112, No. 46, Nov. 2008, pp. 18039-18049.
O.P. Tkachenko et al. "Reduction of Copper in Porous Matrixes. Stepwise and Autocatalytic Reduction Routes." The Journal of Physical Chemistry B, vol. 109, No. 44, Nov. 2005, pp. 20979-20988.

* cited by examiner

CLUSTER SUPPORTED CATALYST AND PRODUCTION METHOD THEREFOR

FIELD

The present invention relates to a cluster-supporting catalyst and a production method thereof. More specifically, the present invention relates to a cluster-supporting catalyst for exhaust gas purification, liquid-phase chemical synthesis reaction, gas-phase chemical synthesis reaction, fuel cell reaction, etc., and a production method thereof.

BACKGROUND

A supported catalyst obtained by supporting a catalyst metal on a carrier is used in many fields and is used as a catalyst for exhaust gas purification, liquid-phase chemical synthesis reaction, gas-phase chemical synthesis reaction, fuel cell reaction, etc.

As to such a supported catalyst, it is known that the size of the catalyst metal particles supported on a carrier is important. In this connection, for example, Patent Document 1 has proposed a supported catalyst in which catalyst metal particles having a size of 1 to 10 nm are supported on a carrier of alumina, silica, titania, zirconia or a combination thereof. In addition, Patent Document 2 has proposed a catalyst for nitrogen oxide, in which copper ion is supported on zeolite by ion exchange. Furthermore, Patent Document 3 has proposed a technique where palladium supported on zeolite by ion exchange is dried and then clustered by a reduction treatment to prepare a cluster-supporting catalyst, and the cluster-supporting catalyst is used for a coupling reaction, etc.

RELATED ART

Patent Document

[Patent Document 1] JP2006-212464
[Patent Document 2] JP2012-148272
[Patent Document 3] JP2010-69415

SUMMARY

Problems to be Solved by the Invention

Although various supported catalysts have been proposed as described above, a supported catalyst having further improved catalytic activity is demanded. In this connection, the cluster-supporting catalyst described in Patent Document 3 can exhibit reaction properties different from conventional catalysts, but there is room for improvement in regard to the heat resistance. Among others, in the field of exhaust gas purification, a supported catalyst having an improved low-temperature activity for nitrogen oxide (NOx) reduction and/or carbon monoxide (CO) oxidation after thermal endurance is demanded.

Accordingly, the present invention provides a cluster-supporting catalyst having improved heat resistance, and a production method thereof.

In addition, the present invention provides a method for evaluating the size of catalyst metal particles in a supported catalyst.

Means to Solve the Problems

The present inventors have found that a specific cluster-supporting catalyst has improved heat resistance, and arrived at the present invention described below.

Embodiment 1

A method for producing a cluster-supporting catalyst,
wherein the cluster-supporting catalyst comprises porous carrier particles having acid sites, and catalyst metal clusters supported within the pores of the porous carrier particles; and
wherein the method comprises the followings steps:
providing a dispersion liquid containing a dispersion medium and the porous carrier particles dispersed in the dispersion medium, and
forming, in the dispersion liquid, catalyst metal clusters having a positive charge, and supporting the catalyst metal clusters on the acid sites within the pores of the porous carrier particles through an electrostatic interaction.

Embodiment 2

The method according to embodiment 1, wherein the dispersion liquid is provided by pulverizing the porous carrier particles, and dispersing the pulverized porous carrier particles in the dispersion medium.

Embodiment 3

The method according to embodiment 1 or 2, wherein the clusters are formed in the dispersion liquid by any of the following methods:
a method of laser ablation in liquid,
a method of microwave ablation in liquid,
a method of plasma ablation in liquid, and
a positive-negative inversion method.

Embodiment 4

The method according to embodiment 1 or 2, wherein the clusters are formed in the dispersion liquid by a method of reduction in liquid.

Embodiment 5

The method according to embodiment 4, wherein the dispersion liquid is irradiated with plasma and/or microwave to promote reduction of an ion of the catalyst metal by the reducing agent.

Embodiment 6

The method according to any one of embodiments 1 to 4, wherein the dispersion medium of the dispersion liquid is an organic solvent.

Embodiment 7

A method for evaluating the size of catalyst metal particles supported in a supported catalyst,
wherein the supported catalyst comprises porous carrier particles and catalyst metal particles supported on the porous carrier particles, and wherein the catalyst metal particle size evaluation method comprises the following steps:

providing a dispersion liquid having dispersed therein the supported catalyst, and evaluating the size of the catalyst metal particles in the supported catalyst based on the presence or absence of fluorescence emitted from the supported catalyst by irradiating the dispersion liquid with excitation light.

Embodiment 8

The method according to embodiment 7, further comprising reduction-treating the catalyst metal particles before evaluating the size of the catalyst metal particle.

Embodiment 9

A cluster-supporting catalyst comprising porous carrier particles having acid sites, and catalyst metal clusters supported within the pores of the porous carrier particles, wherein the catalyst metal clusters are obtained by supporting catalyst metal clusters having a positive charge, which is formed in a dispersion liquid containing a dispersion medium and the porous carrier particles dispersed in the dispersion medium, on the acid sites within the pores of the porous carrier particles through an electrostatic interaction.

Embodiment 10

A cluster-supporting catalyst comprising porous carrier particles having acid sites, and catalyst metal clusters supported within the pores of the porous carrier particles, and satisfying any of the following (a) to (d):

(a) the catalyst metal is rhodium and satisfies at least one of the following (a1) to (a3):

(a1) when the cluster-supporting catalyst is subjected to a first thermal endurance treatment for rhodium, then to an oxygen adsorption pretreatment and further to a test by hydrogen temperature-programmed reduction method, the peak of reaction between hydrogen supplied and oxygen adsorbed to the cluster-supporting catalyst is present in the temperature range of 150° C. or less, wherein the first thermal endurance treatment for rhodium is a treatment of subjecting the cluster-supporting catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium, the oxygen adsorption pretreatment is a treatment of adsorbing oxygen to the cluster-supporting catalyst at 30° C. for 1 hour in an oxygen atmosphere and removing excess oxygen at 500° C. for 1 hour in a helium atmosphere, and the test by hydrogen temperature-programmed reduction method is a test of flowing a reducing gas containing 0.5 vol % of hydrogen and the balance helium at a spatial velocity of 10,000 $h^{-1}$ over the cluster-supporting catalyst while raising the temperature at a rate of 10° C./min from 20° C.;

(a2) when the cluster-supporting catalyst is subjected to a second thermal endurance treatment for rhodium and then to a nitric oxide reduction test, (i) the reaction temperature at the time of half of the nitric oxide supplied being reduced into nitrogen satisfies at least either one of 300° C. or less in the temperature rising process and 270° C. or less in the temperature dropping process, and/or (ii) the number of molecules of the nitric oxide molecule when nitric oxide can be reduced by one rhodium atom at a temperature of 250° C. in the temperature dropping process is 0.005 molecules/sec or more, wherein the second thermal endurance treatment for rhodium is a treatment of heating the cluster-supporting catalyst for 1 hour in an atmosphere at 800° C. containing 8 vol % of oxygen, 0.3 vol % of carbon monoxide and the balance helium, and the nitric oxide reduction test is a test of flowing a model gas containing 0.1 vol % of $^{15}NO$, 0.65 vol % of CO and the balance helium at a spatial velocity of 10,000 $h^{-1}$, performing a temperature rising process of raising the temperature at a rate of 10° C./min to 800° C. from room temperature, and then performing a temperature dropping process of lowering the temperature to room temperature; and (a3) when the cluster-supporting catalyst is subjected to a cleaning treatment and then to an adsorbed carbon monoxide oxidation test, the peak of reaction between carbon monoxide adsorbed to the cluster-supporting catalyst and oxygen in the atmosphere is present in the temperature range of 200° C. or less, wherein the cleaning treatment consists of the following steps (i) to (iv):

(i) putting the catalyst at a concentration of 4 mass % in an aqueous 1 M sodium chloride solution, followed by stirring at 80° C. for 10 days, (ii) after (i) above, rinsing the catalyst with ion-exchanged water, (iii) after (ii) above, putting the catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water, and the adsorbed carbon monoxide oxidation test is a test of adsorbing carbon monoxide to the cluster-supporting catalyst by holding the cluster-supporting catalyst at 800° C. for 1 hour in an atmosphere containing 500 ppm by volume of carbon monoxide and the balance helium, and thereafter oxidizing the carbon monoxide adsorbed to the cluster-supporting catalyst into carbon dioxide with oxygen by heating the cluster-supporting catalyst having adsorbed thereto carbon monoxide at a rate of 10° C./min to 800° C. in an atmosphere containing 10 vol % of oxygen and the balance helium;

(b) the catalyst metal is palladium and when the cluster-supporting catalyst is subjected to a thermal endurance treatment for palladium and then to a carbon monoxide purification test for palladium, the number of molecules of the carbon monoxide molecule capable of being oxidized to carbon dioxide molecule by one palladium atom is 0.004 molecules/sec or more, wherein the thermal endurance treatment for palladium is a treatment of heating the cluster-supporting catalyst for 10 hours in an atmosphere at 800° C. containing 20 vol % of oxygen and the balance helium, and the carbon monoxide purification test for palladium is a test of flowing a model gas containing 0.3 vol % of carbon monoxide, 8.0 vol % of oxygen and the balance helium at a spatial velocity of 10,000 $h^{-1}$ over the cluster-carried catalyst, performing a temperature rising process of raising the temperature at a rate of 10° C./min to 800° C. from room temperature, then performing a temperature dropping process of lowering the temperature to room temperature, and measuring the catalytic activity at a temperature of 100° C. in the temperature dropping process;

(c) the catalyst metal is platinum and satisfies at least one of the following (c1) and (c2):

(c1) when the cluster-supporting catalyst is subjected to a thermal endurance treatment for platinum and then to a carbon monoxide purification test for platinum, the number of molecules of the carbon monoxide molecule capable of being oxidized to carbon dioxide molecule by one platinum atom is 0.00015 molecules/sec or more, wherein the thermal endurance treatment for platinum is a treatment of heating the cluster-supporting catalyst for 10 hours in an atmosphere at 800° C. containing 20 vol % of oxygen and the balance helium, and the carbon monoxide purification test for platinum is a test of flowing a model gas containing 0.3 vol % of carbon monoxide, 8.0 vol % of oxygen and the balance helium at a spatial velocity of 10,000 h$^{-1}$ over the cluster-carried catalyst, performing a temperature rising process of raising the temperature at a rate of 10° C./min to 800° C. from room temperature, then performing a temperature dropping process of lowering the temperature to room temperature, and measuring the catalytic activity at a temperature of 60° C. in the temperature dropping process, and (c2) when the cluster-supporting catalyst is subjected to a cleaning treatment and then to an adsorbed carbon monoxide oxidation test, the peak of reaction between carbon monoxide adsorbed to the cluster-supporting catalyst and oxygen in the atmosphere is present in the temperature range of 200° C. or less, wherein the cleaning treatment consists of the following steps (i) to (iv):

(i) putting the catalyst at a concentration of 4 mass % in an aqueous 1 M sodium chloride solution, followed by stirring at 80° C. for 10 days, (ii) after (i) above, rinsing the catalyst with ion-exchanged water, (iii) after (ii) above, putting the catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water, and the adsorbed carbon monoxide oxidation test is a test of adsorbing carbon monoxide to the cluster-supporting catalyst by holding the cluster-supporting catalyst at 800° C. for 1 hour in an atmosphere containing 500 ppm by volume of carbon monoxide and the balance helium, and thereafter oxidizing the carbon monoxide adsorbed to the cluster-supporting catalyst into carbon dioxide with oxygen by heating the cluster-supporting catalyst having adsorbed thereto carbon monoxide at a rate of 10° C./min to 800° C. in an atmosphere containing 10 vol % of oxygen and the balance helium; and (d) the catalyst metal is copper and when the cluster-supporting catalyst is subjected to a nitric oxide temperature-programmed desorption test, the maximum peak in the range of 200 to 400° C. is present in the range of 200 to 300° C., wherein the nitric oxide temperature-programmed desorption test is a test of adsorbing nitric oxide to the supported catalyst through heating at 800° C. for 1 hour in an atmosphere containing 10 vol % of oxygen and the balance helium, heating at 800° C. for 30 minutes in an atmosphere containing 100 vol % of helium, lowering of the ambient temperature to 25° C., holding for 1 hour in an atmosphere containing 500 ppm by volume of nitric oxide and the balance helium, and holding for 1 hour in an atmosphere containing 100 vol % of helium, and thereafter heating the supported catalyst having adsorbed thereto nitric oxide at a temperature rise rate of 10° C./min to 800° C. in an atmosphere containing 100 vol % of helium.

Embodiment 11

The cluster-supporting catalyst according to embodiment 10, which satisfies (a) above.

Embodiment 12

The cluster-supporting catalyst according to embodiment 10, which satisfies (b) above.

Embodiment 13

The cluster-supporting catalyst according to embodiment 10, which satisfies (c) above.

Embodiment 14

The cluster-supporting catalyst according to embodiment 10, which satisfies (d) above.

Embodiment 15

The cluster-supporting catalyst according to any one of embodiments 9 to 14, wherein the catalyst metal supporting rate in pores as defined by the following formula is 62.5 mol % or more:

Catalyst metal supporting rate in pores(mol %)=$B/A$

A: the number of atoms (mol/g) of all the catalyst metal supported on the porous carrier particles, B: the number of atoms (mol/g) of the catalyst metal, determined by either the following evaluation standard (B1) or (B2):

(B1) the number of atoms (mol/g) of the catalyst metal obtained by subtracting the catalyst metal present as one atomic ion and the catalyst metal supported on the outer surface of the porous carrier particles, from the number of atoms of all the catalyst metal supported on the porous carrier particles, or (B2) the number of atoms (mol/g) of the catalyst metal supported on the porous carrier particles after the following treatments (i) to (iv):

(i) putting the cluster-supporting catalyst at a concentration of 4 mass % in an aqueous 1 M sodium chloride solution, followed by stirring at 80° C. for 10 days, (ii) after (i) above, rinsing the cluster-supporting catalyst with ion-exchanged water, (iii) after (ii) above, putting the cluster-supporting catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water.

Embodiment 16

The cluster-supporting catalyst according to any one of embodiments 9 to 15, wherein the porous carrier particles is a particle of a microporous material.

Embodiment 17

The cluster-supporting catalyst according to any one of embodiments 9 to 16, wherein the porous carrier particles is a zeolite particle.

Embodiment 18

The catalyst according to any one of embodiments 9 to 17, which is an exhaust gas purification catalyst.

Embodiment 19

The catalyst according to any one of embodiments 9 to 18, which is a catalyst for liquid-phase synthesis reaction, gas-phase synthesis reaction or fuel cell reaction.

Embodiment 20

A catalyst device comprising the catalyst according to any one of embodiments 9 to 19 and a substrate supporting the catalyst.

Effects of the Invention

According to the cluster-supporting catalyst of the present invention, an improved catalytic activity can be provided. Furthermore, according to the method of the present invention for evaluating the size of catalyst metal particles, the size of catalyst metal particles can be evaluated in a supported catalyst.

BRIEF DESCRIPTION OF THE DRAWINGS

FIG. 5 depicts graphs illustrating the carbon monoxide purification performance with respect to the rhodium cluster-supporting catalysts of Example 4 and Comparative Example 2.

FIG. 6 depicts graphs illustrating the carbon monoxide purification performance with respect to the rhodium cluster-supporting catalysts of Example 5 and Comparative Example 3.

FIG. 7 depicts graphs illustrating the carbon monoxide purification performance with respect to the rhodium-supported catalysts of Example 6 and Comparative Example 4.

FIG. 8 depicts graphs illustrating the carbon monoxide purification performance with respect to the rhodium cluster-supporting catalysts of Examples 7 to 10.

MODE FOR CARRYING OUT THE INVENTION

Figure 1A:
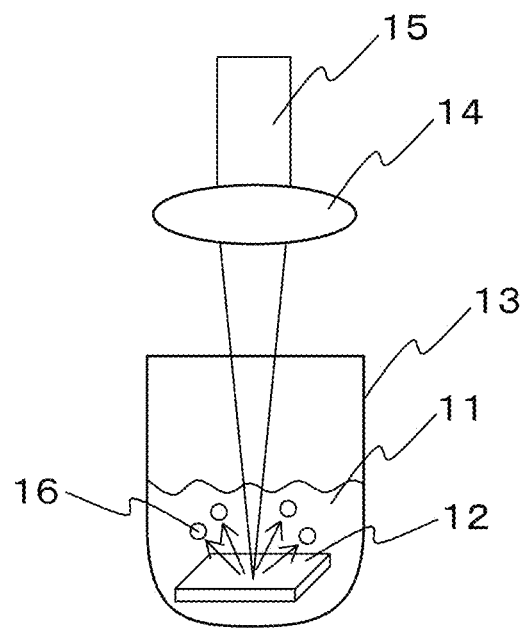
FIG. 1 is a diagram illustrating one embodiment of the method for producing the cluster-supporting catalyst of the present invention.

The embodiments of the present invention is described in detail below. The present invention is not limited to the following embodiments and can be implemented by making various modifications therein without departing from the scope of the gist of the present invention.

<<Production Method of Cluster-Supporting Catalyst>>

In the method of the present invention for producing a cluster-supporting catalyst, a cluster-supporting catalyst, particularly, the cluster-supporting catalyst of the present invention, including porous carrier particles having acid sites, and catalyst metal clusters supported within the pores of the porous carrier particles, is produced.

This method includes: providing a dispersion liquid containing a dispersion medium and porous carrier particles dispersed in the dispersion medium; and in the dispersion liquid, forming catalyst metal clusters having a positive charge, and supporting the catalyst metal clusters on the acid sites within the pores of the porous carrier particles through an electrostatic interaction. The method may further include drying and firing the porous carrier particles having supported thereon the catalyst metal clusters.

According to the method of the present invention, in a dispersion liquid in which porous carrier particles is present, catalyst metal clusters are formed and the formed catalyst metal clusters are supported within the pores of the porous carrier particles, whereby catalyst metal clusters having a controlled size, particularly, catalyst metal clusters having a relatively uniform size, can be supported within the pores of the porous carrier particle. The size of the catalyst metal clusters can be controlled by adjusting the conditions for forming the catalyst metal clusters in the dispersion liquid.

It is considered that according the method of the present invention, when the catalyst is subjected to thermal endurance, the catalyst metal clusters are prevented from becoming unstable and being readily aggregated and a cluster-supporting catalyst having improved heat resistance can thereby be obtained. On the contrary, in the case of supporting a catalyst metal ion within the pores through ion exchange and after drying, reducing the catalyst metal ion to form catalyst metal clusters within the pore, it is believed that because the clusters supported within the pores have a relatively non-uniform size, the clusters are likely to become unstable and aggregate when subjected to thermal endurance.

In the method of the present invention, catalyst metal clusters can be supported within the pores of the porous carrier particles through an electrostatic interaction.

The electrostatic interaction enables the catalyst metal clusters having a positive charge to be supported on the acid sites within the pores of the porous carrier particles having a negative charge.

<Catalyst Metal>

The catalyst metal constituting the catalyst metal clusters may be any metal or half-metal usable as a catalyst in the intended application. The catalyst metal is selected, for example, from the group consisting of gold, silver, platinum, palladium, rhodium, iridium, ruthenium, titanium, vanadium, chromium, manganese, iron, cobalt, nickel, copper, zinc, molybdenum, tungsten, rhenium, silicon, germanium, and a combination thereof.

The cluster-supporting catalyst obtained by the method of the present invention can stably maintain the catalytic activity of the catalyst metal, and the catalytic activity of the catalyst metal can thereby be provided while reducing the use amount of the catalyst metal. Accordingly, the method of the present invention is effective particularly when an expensive catalyst metal is used, for example, when a catalyst metal selected from the group consisting of platinum, palladium, rhodium, iridium ruthenium and a combination thereof is used as the catalyst metal.

Incidentally, in view of catalytic activity, the catalyst metal is preferably particles having a fine particle diameter. As described below regarding the method of the present invention for judging the metal particle size, the catalyst metal particles can be confirmed to have a fine particle diameter by utilizing a phenomenon that when the metal particles have a particle diameter of 1 nm or less, particularly, when the metal particles are of a cluster size, the metal particles emits fluorescence upon irradiation with excitation light.

<Porous Carrier Particle>

The porous carrier particles may be any porous carrier particles usable in the intended application, and may be, for example, particles of a material selected from the group consisting of a microporous material, a mesoporous material, a macroporous material, and a combination thereof.

The microporous material means a porous material in which a maximum peak in the volume-based pore diameter distribution is present in the range from more than 0.1 nm to 2 nm; the mesoporous material means a porous material in which a maximum peak in the pore diameter distribution above is present in the range from more than 2 nm to 50 nm; and the macroporous material means a porous material in which a maximum peak in the pore diameter distribution above is present in the range of more than 50 nm. With respect to the present invention, the volume-based pore diameter distribution is a value by the nitrogen adsorption method and can be obtained according to BET equation (adsorption isotherm equation) by using, for example, an automatic specific surface area/porosimetry analyzer Tristar II 3020 Series (Shimadzu Corporation).

Specifically, for example, the microporous material includes a material selected from the group consisting of activated carbon, zeolite, clay silicate, and a combination thereof. The zeolite may be a zeolite derivative or a heteroelement-doped zeolite, and the dissimilar element doped in the heteroelement-doped zeolite may be, for example, an element selected from the group consisting of boron, iron, germanium, gallium, lanthanum, titanium, and a combination thereof.

In addition, the zeolite may be arbitrary zeolite usable in the intended application and includes, for example, A-type (code: LTA), ferrierite type (code: FER), MCM-22 type (code: MWW), ZSM-5 type, silicalite type (code: MFI), mordenite type (code: MOR), L-type (code: LTL), Y-type and X-type (code: FAU), beta-type (code: BEA), SSZ-type (code: CHA), and a combination thereof.

The mesoporous material includes a material selected from the group consisting of porous ionic crystal, mesoporous silica, mesoporous titania, and a combination thereof, which is, for example, MCM-41 and FSM-16. In addition, the mesoporous material includes Porous Coordination Polymer (PCP)/Metal-Organic Framework (MOF), which may have a pore diameter ranging from 0 to several nm.

The macroporous material includes a macroporous metal oxide, a macroporous semiconductor oxide, and a combination thereof, for example, macroporous titanium oxide, macroporous tin oxide, and macroporous zinc oxide.

The porous carrier particles are preferably a porous carrier having acid sites (i.e., electron-rich sites or sites having negative charges) in the pore, for example, zeolite, in order to stably support the catalyst metal within the pores and/or successfully bring out the activity of the catalyst metal supported.

In the method of the present invention for producing a cluster-supporting catalyst, zeolite particles are preferably used as the porous carrier particles. Because, in the case of using zeolite particles as the porous carrier particles, the catalyst metal clusters having a positive charge can be supported on the acid sites within the pores of the zeolite particles having a negative charge. Accordingly, the zeolite particles preferably have a relatively small zeta potential and may have a zeta potential of, for example, −50 mV or less, −70 mV or less, −90 mV or less, or −100 mV or less. For the same reason, the zeolite particles preferably has a relatively large number of acid sites, i.e., has a relatively small Si/Al ratio, and may have an Si/Al ratio of, for example, 500 or less, 300 or less, 100 or less, or 50 or less.

In the method of the present invention, the dispersion liquid can be provided by pulverizing the porous carrier particle and dispersing the pulverized porous carrier particles in the dispersion medium.

In this case, since the porous carrier particles are previously pulverized, the catalyst metal clusters can be accelerated to be supported within the pores of the porous carrier particle. Incidentally, such a pulverized porous carrier particles have sometimes become amorphous, and the porous carrier particles may therefore be recrystallized, if desired, by annealing before or after the catalyst metal clusters are supported.

<Dispersion Medium of Dispersion Liquid>

As the dispersion medium of the dispersion liquid, any dispersion medium capable of drawing the catalyst metal clusters into the pores of the porous carrier particles through an electrostatic interaction between the catalyst metal clusters and the acid sites of the porous carrier particles can be used.

In this connection, in the case where the catalyst metal clusters are supported within the pores of the porous carrier particles through an electrostatic interaction, the dispersion medium can be selected so that the surface of the catalyst metal clusters can have a positive charge and the acid sites within the pores of the porous carrier particles can have a negative charge. Accordingly, in order to accelerate the catalyst metal clusters to be supported within the pores of the porous carrier particles, the zeta potential and/or the ionization rate of the catalyst metal clusters and/or the porous carrier particles can be adjusted by adjusting the pH of the dispersion medium and/or adding a salt to the dispersion medium.

As regards this, the surface potentials of the catalyst metal clusters and the porous carrier particles cannot be directly measured but can be known indirectly by measuring the zeta potential (interfacial electrokinetic potential).

For example, the zeta potential of platinum cluster greatly depends on pH and when the pH is 8 or less, the zeta potential slightly increases as the pH decreases. This is considered to occur because the platinum atom on the surface of the platinum cluster has been partially oxidized and the platinum atom on a part of the platinum cluster surface is protonated into Pt—$H^+$ the moment the oxidized platinum atom enters the Pt—OH state along with decrease in pH, as a result, the positive charge density increases, leading to an increase in the zeta potential.

On the other hand, when the pH is more than 8, the zeta potential of the platinum cluster rapidly decreases as the pH increases. This is considered to occur because the platinum atom oxidized along with increase in pH becomes Pt—$O^−$ and furthermore, the platinum cluster surface is partially deprotonated, as a result, the positive charge density decreases, leading to a decrease in the zeta potential.

In the case of using an electrostatic interaction, the dispersion medium may be aqueous or nonaqueous, but it is generally preferable to use a nonaqueous dispersion medium, for example, an organic solvent. Because, if an aqueous dispersion medium is used, stabilization of the catalyst metal clusters occurs in the dispersion medium due to the high dielectric constant of water (dielectric constant: 80), i.e., the high polarity, and the catalyst metal clusters may thereby not be sufficiently supported within the pores of the porous carrier particle.

On the other hand, in the case of using a dispersion medium having a relatively low polarity, i.e., a dispersion medium having a relatively low dielectric constant, the catalyst metal clusters are not stabilized in the dispersion medium and can be supported within the pores of the porous carrier particles through an electrostatic interaction and stabilized there.

Accordingly, as the dispersion medium, a dispersion medium having a lower dielectric constant than that of water (dielectric constant: 80), for example, a dispersion medium having a dielectric constant of 50 or less, 40 or less, 30 or less, 25 or less, or 20 or less, can be used. Specifically, acetone (dielectric constant: 20), 2-propanol (dielectric constant: 18), ethanol (dielectric constant: 25), methanol (dielectric constant: 32), carbon tetrachloride (dielectric constant: 2.2), etc. can be used as the dispersion medium.

<Formation of Catalyst Metal Cluster>

The catalyst metal cluster, particularly, the catalyst metal clusters having a positive charge, can be formed by any method in the dispersion medium. The method for forming such catalyst metal clusters includes methods such as method of laser ablation in liquid, method of microwave ablation in liquid, method of plasma abrasion in liquid, positive-negative inversion method, and method of reduction in liquid (liquid-phase reduction method).

The method of laser ablation in liquid, method of microwave ablation in liquid and method of plasma ablation in liquid are a method of forming catalyst metal clusters by irradiating a catalyst metal target disposed in a dispersion medium with laser, microwave or plasma.

In the positive-negative inversion method, first, negatively charged zeolite and a metal ion source having a negative charge are caused to be present together in a solution, particularly, in an aqueous solution. Specifically, for example, in the case of using $H_2[PtCl_6]$, platinum is caused to be present as a negative ion of $[PtCl_6]^{2−}$. In this state, an ion exchanger is not produced due to repulsive force between negative charges. A pulsed laser is converged and introduced into this solution. According to this introduction, a plasma is generated in the laser focus region to produce various chemical species (a metal ion from which a ligand is removed, a plasma metal ion produced after electron detachment of a negative metal ion source, etc.) from the metal ion source, and furthermore, a neutral metal atom forms an aggregate with a positive metal ion to produce a positively charged metal clusters. The positively charged metal cluster produced in this way is supported on the acid sites of zeolite through an electrostatic interaction.

The method of reduction in liquid is a method of forming catalyst metal clusters by reducing the catalyst metal ion with use of a reducing agent.

In the method of reduction in liquid, any reducing agent capable of reducing the catalyst metal ion in liquid can be used. Specifically, for example, a hydride reducing agent such as sodium borohydride, and an alcohol such as propanol, can be used as the reducing agent. In addition, in the method of reduction in liquid, it is also preferable to use a dispersion medium stable to the reducing agent used, which is a dispersion medium capable of dissolving a metal salt as a catalyst metal ion supply source and the reducing agent. Accordingly, the same compound can be used for both the reducing agent and the dispersant, for example, an alcohol can be used for both the reducing agent and the dispersant.

In the method of reduction in liquid, the reduction of the catalyst metal ion may be promoted by optionally using microwave or plasma in liquid, in addition to the reducing agent.

Incidentally, in order to form catalyst metal clusters having a controlled size, e.g., catalyst metal clusters having a relatively uniform size, for example, in the method of reduction in liquid, uniform reduction of the catalyst metal ion can be promoted in the dispersion liquid by optionally using microwave or plasma in liquid, in addition to the reducing agent.

<<Cluster-Supporting Catalyst>>

The cluster-supporting catalyst of the present invention includes porous carrier particles having acid sites, and catalyst metal clusters supported within the pores of the porous carrier particle.

The cluster-supporting catalyst of the present invention has excellent low-temperature activity even after thermal endurance treatment, and this means that the cluster in the porous carrier is stably maintained despite being subjected to thermal endurance treatment. Although not to be bound by theory, the stability of the clusters are believed to be attributable to the fact that, for example, the clusters having a positive charge are stably fixed to the acid sites having a negative charge, and/or the clusters supported within the pores have a relatively uniform size.

On the other hand, it is considered that in the case of supporting the catalyst metal ion within the pores by ion exchange and after drying, reducing the catalyst metal ion to thereby form catalyst metal clusters within the pore, the clusters supported within the pores have a relatively non-uniform size and is thereby likely to become unstable and aggregate when thermal endurance treatment is performed.

For example, in the cluster-supporting catalyst of the present invention, catalyst metal clusters having a positive charge, which is formed in a dispersion liquid containing a dispersion medium and porous carrier particles dispersed in the dispersion medium, is supported on the acid sites within the pores of the porous carrier particles through an electrostatic interaction, and the catalyst metal clusters supported within the pores of the porous carrier particles are thereby formed.

In addition, for example, the cluster-supporting catalyst of the present invention satisfies any of the following properties (a) to (d).

(a) The catalyst metal is rhodium and satisfies at least one of the following (a1) to (a3).

(a1) When the cluster-supporting catalyst is subjected to a first thermal endurance treatment for rhodium, then to an oxygen adsorption pretreatment and further to a test by hydrogen temperature-programmed reduction method, the peak of reaction between hydrogen supplied and oxygen adsorbed to the cluster-supporting catalyst is present in the temperature range of 150° C. or less. The reaction peak may be present, for example, in the temperature range of 100° C. or more.

The "first thermal endurance treatment for rhodium" is a treatment of subjecting the cluster-supporting catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

The "oxygen adsorption pretreatment" is a treatment of adsorbing oxygen to the cluster-supporting catalyst at 30° C. for 1 hour in an oxygen atmosphere and removing excess oxygen at 500° C. for 1 hour in a helium atmosphere.

The "test by hydrogen temperature-programmed reduction method" is a test of flowing a reducing gas containing 0.5 vol % of hydrogen and the balance helium at a spatial velocity of 10,000 $h^{-1}$ for the cluster-supporting catalyst while raising the temperature at a rate of 10° C./min from 20° C.

(a2) When the cluster-supporting catalyst is subjected to a second thermal endurance treatment for rhodium and then to a nitric oxide reduction test, (i) the reaction temperature at the time of half of the nitric oxide supplied being reduced into nitrogen satisfies at least either one of 300° C. or less in the temperature rising process and 270° C. or less in the temperature dropping process, and/or (ii) the number of molecules of the nitric oxide molecule when nitric oxide can be reduced by one rhodium atom at a temperature of 250° C. in the temperature dropping process is 0.005 molecules/sec or more. The reaction temperature may be, for example, 290° C. or less, or 280° C. or less, and may be 250° C. or more, 260° C. or more, or 270° C. or more, in the temperature rising process. The reaction temperature may be, for example, 260° C. or less and may be 240° C. or more, or 250° C. or more, in the temperature dropping process. The number of molecules of the nitric oxide molecule may be 0.006 molecules/sec or more, or 0.007 molecules/sec or more, and may be 0.010 molecules/sec or less, 0.009 molecules/sec or less, or 0.008 molecules/sec or less.

The "second thermal endurance treatment for rhodium" is a treatment of heating the cluster-supporting catalyst for 1 hour in an atmosphere at 800° C. containing 8 vol % of oxygen, 0.3 vol % of carbon monoxide and the balance helium.

The "nitric oxide reduction test" is a test of flowing a model gas containing 0.1 vol % of $^{15}NO$, 0.65 vol % of CO and the balance helium at a spatial velocity of 10,000 $h^{-1}$, performing a temperature rising process of raising the temperature at a rate of 10° C./min to 800° C. from room temperature, and then performing a temperature dropping process of lowering the temperature to room temperature.

(a3) When the cluster-supporting catalyst is subjected to a cleaning treatment and then to an adsorbed carbon monoxide oxidation test, the peak of reaction between carbon monoxide adsorbed to the cluster-supporting catalyst and oxygen in the atmosphere is present in the temperature range of 200° C. or less. The peak may be a maximum peak, for example, in the temperature range of 50 to 700° C. In addition, the peak may be present in the temperature range of 100° C. or more.

The "cleaning treatment" consists of the following steps (i) to (iv):

(i) putting the catalyst at a concentration of 4 mass % in an aqueous 1 M sodium chloride solution, followed by stirring at 80° C. for 10 days, (ii) after (i) above, rinsing the catalyst with ion-exchanged water, (iii) after (ii) above, putting the catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water.

The adsorbed carbon monoxide oxidation test is a test of adsorbing carbon monoxide to the cluster-supporting catalyst by holding the cluster-supporting catalyst at 800° C. for 1 hour in an atmosphere containing 500 ppm by volume of carbon monoxide and the balance helium, and thereafter oxidizing the carbon monoxide adsorbed to the cluster-supporting catalyst into carbon dioxide with oxygen by heating the cluster-supporting catalyst having adsorbed thereto carbon monoxide at a rate of 10° C./min to 800° C. in an atmosphere containing 10 vol % of oxygen and the balance helium.

(b) The catalyst metal is palladium and when the cluster-supporting catalyst is subjected to a thermal endurance treatment for palladium and then to a carbon monoxide purification test for palladium, the number of molecules of the carbon monoxide molecule capable of being oxidized to carbon dioxide molecule by one palladium atom is 0.004 molecules/sec or more. The number of molecules of the carbon monoxide molecule may be, for example, 0.005 molecules/sec or more, 0.006 molecules/sec or more, or 0.007 molecules/sec or more, and may be 0.020 molecules/sec or less, 0.015 molecules/sec or less, or 0.010 molecules/sec or less.

The "thermal endurance treatment for palladium" is a treatment of heating the cluster-supporting catalyst for 10 hours in an atmosphere at 800° C. containing 20 vol % of oxygen and the balance helium.

The "carbon monoxide purification test for palladium" is a test of flowing a model gas containing 0.3 vol % of carbon monoxide, 8.0 vol % of oxygen and the balance helium at a spatial velocity of 10,000 $h^{-1}$ for the cluster-carried catalyst, performing a temperature rising process of raising the temperature at a rate of 10° C./min to 800° C. from room temperature, then performing a temperature dropping process of lowering the temperature to room temperature, and measuring the catalytic activity at a temperature of 100° C. in the temperature dropping process.

(c) The catalyst metal is platinum and satisfies at least one of the following (c1) and (c2).

(c1) When the cluster-supporting catalyst is subjected to a thermal endurance treatment for platinum and then to a carbon monoxide purification test for platinum, the number of molecules of the carbon monoxide molecule capable of being oxidized to carbon dioxide molecule by one platinum atom is 0.00015 molecules/sec or more. The number of molecules of the carbon monoxide molecule may be, for example, 0.00015 molecules/sec or more, or 0.00017 molecules/sec or more, and may be 0.00030 molecules/sec or less, or 0.00025 molecules/sec or less.

The "thermal endurance treatment for platinum" is a treatment of heating the cluster-supporting catalyst for 10 hours in an atmosphere at 800° C. containing 20 vol % of oxygen and the balance helium.

The "carbon monoxide purification test for platinum" is a test of flowing a model gas containing 0.3 vol % of carbon monoxide, 8.0 vol % of oxygen and the balance helium at a spatial velocity of 10,000 $h^{-1}$ for the cluster-carried catalyst, performing a temperature rising process of raising the temperature at a rate of 10° C./min to 800° C. from room temperature, then performing a temperature dropping process of lowering the temperature to room temperature, and measuring the catalytic activity at a temperature of 60° C. in the temperature dropping process.

(c2) When the cluster-supporting catalyst is subjected to a cleaning treatment and then to an adsorbed carbon monoxide oxidation test, the peak of reaction between carbon monoxide adsorbed to the cluster-supporting catalyst and oxygen in the atmosphere is present in the temperature range of 200° C. or less. The peak may be a maximum peak, for example, in the temperature range of 50 to 700° C. In addition, the peak may be present in the temperature range of 50° C. or more.

The "cleaning treatment" consists of the following steps (i) to (iv):

(i) putting the catalyst at a concentration of 4 mass % in an aqueous 1 M sodium chloride solution, followed by stirring at 80° C. for 10 days, (ii) after (i) above, rinsing the catalyst with ion-exchanged water, (iii) after (ii) above, putting the catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water.

The "adsorbed carbon monoxide oxidation test" is a test of adsorbing carbon monoxide to the cluster-supporting catalyst by holding the cluster-supporting catalyst at 800° C. for 1 hour in an atmosphere containing 500 ppm by volume of carbon monoxide and the balance helium, and thereafter oxidizing the carbon monoxide adsorbed to the cluster-supporting catalyst into carbon dioxide with oxygen by heating the cluster-supporting catalyst having adsorbed thereto carbon monoxide at a rate of 10° C./min to 800° C. in an atmosphere containing 10 vol % of oxygen and the balance helium.

(d) The catalyst metal is copper and when the cluster-supporting catalyst is subjected to a nitric oxide temperature-programmed desorption test, the maximum peak in the range of 200 to 400° C. is present in the range of 200 to 300° C. The position of the maximum peak may be, for example, at 220° C. or more, 240° C. or more, or 260° C. or more, and at 300° C. or less, 290° C. or less, or 280° C. or less.

The "nitric oxide temperature-programmed desorption test" is a test of adsorbing nitric oxide to the supported catalyst through heating at 800° C. for 1 hour in an atmosphere containing 10 vol % of oxygen and the balance helium, heating at 800° C. for 30 minutes in an atmosphere containing 100 vol % of helium, lowering of the ambient temperature to 25° C., holding for 1 hour in an atmosphere containing 500 ppm by volume of nitric oxide and the balance helium, and holding for 1 hour in an atmosphere containing 100 vol % of helium, and thereafter heating the supported catalyst having adsorbed thereto nitric oxide at a temperature rise rate of 10° C./min to 800° C. in an atmosphere containing 100 vol % of helium.

The "peak" as used herein means a portion where when a graph of gas concentration is obtained, the ratio (S/N ratio) between peak signal (S) and noise (N) has a minimum value of 2.0 or more, 3.0 or more, 4.0 or more, or 5.0 or more, a maximum value. Specifically, the noise (N) can be specified as a concentration variation range at 30° C. selected such that the concentration variation in a place around the peak, which is not the peak, becomes minimum near the peak in the graph of gas concentration. The peak signal (S) can be measured as the distance from the center value of the noise portion near the peak.

In the cluster-supporting catalyst of the present invention, the catalyst metal supporting rate in pores may be 10 mol % or more, 20 mol % or more, 30 mol % or more, 40 mol % or more, 50 mol % or more, 60 mol % or more, or 62.5 mol % or more. In addition. the catalyst metal supporting rate in pores may be less than 100 ml %, 90 mol % or less, 80 mol % or less, or 70 mol % or less.

The "cluster" is generally defined as an aggregate of up to several hundred chemical species, but in the present invention, the "cluster-supporting catalyst" means a catalyst in which a fine catalyst metal including a clusters are supported on the carrier particle.

The "catalyst metal supporting rate in pore" is an indicator of the ratio of the catalyst metal entered the pores of the porous carrier particles to all the catalyst metal supported on the porous carrier particle.

In the present invention, the "catalyst metal supporting rate in pore" is represented by the formula: B/A.

In the formula above, the number of atoms "A" of the catalyst metal means the number of atoms of all the catalyst metal supported on the porous carrier particle. More specifically, the number of atoms "A" of the catalyst metal means the number of atoms of all the catalyst metal supported on the porous carrier particles, irrespective of whether the catalyst metal is present in the state of one atomic ion, in the state of a cluster, or in the state of a particle larger than a cluster, or whether the catalyst metal is supported within the pores or supported on the outer surface.

With respect to the number of atoms "A" of the catalyst metal, the number of atoms of the catalyst metal can be measured by dissolving the catalyst metal and the carrier particles supporting the catalyst metal in an acid, etc., and performing inductively coupled plasma spectrometry (ICP-OES). In this case, as the ICP-OES apparatus, for example, SPS5100 or SPS3000 of Hitachi High-Tech Science Corporation can be used.

The number of atoms "B" corresponds of the number of atoms of the catalyst metal present as clusters and particles within the pores of the porous carrier particles. Specifically, the number of atoms "B" is the number of atoms (mol/g) of the catalyst metal, determined by ether the following evaluation standard (B1) or (B2).

The number of atoms of the catalyst metal determined by the evaluation standard (B1) is the number of atoms (mol/g) of the catalyst metal obtained by subtracting the catalyst metal present as one atomic ion and the catalyst metal supported on the outer surface of the porous carrier particles, from the number of atoms of all the catalyst metal supported on the porous carrier particle.

The evaluation standard (B1) is based on the assumption that: the "catalyst metal present as one atomic ion" is removable on the ion exchange principle; the "catalyst metal supported on the outer surface of the porous carrier particle" is removable by cleaning with a reducing agent, an acid, an alkali, an organic compound cleaner, a surfactant, and a chelating agent; and whether the catalyst metal supported on the outer surface could be removed can be confirmed by electron microscope observation. In other words, the number of atoms "B" of the catalyst metal determined according to (B2) corresponds to the amount of the catalyst metal present within the pores of the porous carrier particle.

The number of atoms of the catalyst metal determined by the evaluation standard (B2) is the number of atoms (mol/g) of the catalyst metal supported in the cluster-supporting catalyst after the following treatments (i) to (iv):

(i) putting the cluster-supporting catalyst at a concentration of 4 mass % in an aqueous 1 M sodium chloride solution, followed by stirring at 80° C. for 10 days, (ii) after (i) above, rinsing the cluster-supporting catalyst with ion-exchanged water, (iii) after (ii) above, putting the cluster-supporting catalyst at a concentration of 4 mass % in an aqueous solution containing 6 mass % of polyoxyethylene sorbitan monolaurate (for example, Tween 20 (trademark) of Tokyo Chemical Industry Co., Ltd.), 0.25 M trisodium ethylenediaminetetraacetate, and 0.01 M sodium borohydride, followed by stirring at 80° C. for 10 days, and (iv) after (iii) above, rinsing the catalyst with ion-exchanged water.

In the operation of the evaluation standard (B2), the number of atoms of the catalyst metal means the number of atoms of the catalyst metal supported within the pores of the porous carrier particles after the catalyst metal present as one atomic ion within the pores or on the outer surface of the porous carrier particles is dissolved in a salt solution and thereby removed (treatments (i) and (ii)) and the catalyst metal present on the outer surface of the porous carrier particles without entering the pores of the porous carrier particles is removed using a nonionic surfactant, a chelating agent, and a reducing agent (treatments (iii) and (iv)). In other words, the number of atoms "B" of the catalyst metal determined by the evaluation standard (B2) corresponds to the amount of the catalyst metal present within the pores of the porous carrier particle.

Catalyst metal clusters larger than the pores of the porous carrier particles are of course prevented from entering the pores of the porous carrier particle. Accordingly, the catalyst metal being present within the pores of the porous carrier particles means that the size of the catalyst metal clusters are smaller than the size of the pores of the porous carrier particle. Specifically, the catalyst metal being present, for example, within the pores of a microporous material, i.e., a porous material mainly having a pores of 2.0 nm or less, suggests that the catalyst metal clusters are clusters having a particle diameter of 2.0 nm or less, particularly, 1.0 nm or less. In other words, the number of atoms "B" of the catalyst metal present within the porous carrier particles as a microporous material corresponds to the amount of the cluster within the pore.

With respect to the number of atoms "B" of the catalyst metal, the number of atoms of the catalyst metal can be measured by dissolving the catalyst metal and the carrier particles supporting the catalyst metal in an acid, etc., and performing inductively coupled plasma spectrometry (ICP-OES). In this case, as the ICP-OES apparatus, for example, SPS5100 or SPS3000 of Hitachi High-Tech Science Corporation can be used.

In the cluster-supporting catalyst of the present invention, the catalyst metal is present in a fine state, whereby high and/or inherent catalytic activity can be provided. Furthermore, in the cluster-supporting catalyst of the present invention, the catalyst metal supporting rate in pore, i.e., the ratio of the catalyst metal entered the pores of the porous carrier particles to all the catalyst metal supported on the porous carrier particles, is large, whereby the catalytic activity of the catalyst metal can be stably maintained and/or high efficiency can be brought out.

Accordingly, the cluster-supporting catalyst of the present invention can be preferably used, for example, as an exhaust gas purification catalyst, a catalyst for liquid-phase compound synthesis reaction, a catalyst for gas-phase synthesis reaction or a catalyst for fuel cell reaction, particularly, as an exhaust gas purification catalyst.

On the other hand, even when a large amount of fine catalyst metal is supported on a carrier particles, if the catalyst metal is supported on the outer surface of the carrier particles but not within the pores of the carrier particles, the catalyst metal moves and sinters with each other during use of the catalyst, and the activity can thereby be hardly maintained.

<Catalyst Metal>

As to the catalyst metal usable in the cluster-supporting catalyst of the present invention, the description regarding the method of the present invention may be referred to.

<Porous Carrier Particle>

As to the porous carrier particles usable in the cluster-supporting catalyst of the present invention, the description regarding the method of the present invention may be referred to.

<<Catalyst Device>>

The catalyst device of the preened invention includes the cluster-supporting catalyst of the present invention, a substrate supporting the cluster-supporting catalyst, and optionally, a vessel holding the substrate.

In the catalyst device of the present invention, a honeycomb substrate, particularly, a cordierite-made honeycomb substrate, can be used as the substrate. Furthermore, in the catalyst device of the present invention, a vessel made of a metal such as stainless steel can be used as the optional vessel.

<<Method for Evaluating Size of Catalyst Metal Particles Supported in Supported Catalyst>>

The method of the present invention for evaluating the size of catalyst metal particles supported in a supported catalyst includes the following steps:

providing a dispersion liquid having dispersed therein the supported catalyst, and evaluating the size of the catalyst metal particles in the supported catalyst based on the presence or absence of fluorescence emitted from the supported catalyst by irradiating the dispersion liquid with excitation light.

The supported catalyst is a catalyst including porous carrier particles having acid sites, and catalyst metal clusters supported on the porous carrier particle The method of the present invention utilizes a phenomenon that when the metal particles have a particle diameter of 1 nm or less, particularly, when the metal particles are of cluster size, the metal particles emit fluorescence upon irradiation with excitation light. More specifically, in the method of the present invention, whether the catalyst metal particles of the supported catalyst are in the size of a particle emitting fluorescence, i.e., whether the catalyst metal particles have a particle diameter of 1 nm or less, particularly, whether the catalyst metal particles are of cluster size, can be evaluated in the state of the catalyst metal particles being supported on the porous carrier particle.

In the method of the present invention, as the dispersion medium needed to disperse the supported catalyst, any dispersion medium enabling the supported catalyst to be dispersed therein and not reacting in particular with the supported catalyst can be used.

As the excitation light, a long-wavelength ultraviolet ray, for example, an ultraviolet ray having a wavelength of about 350 nm, can be used. A fluorescent spectrometer can be used for confirming the presence or absence of fluorescence. Furthermore, in a simplified manner, the presence or absence of fluorescence can be confirmed with an eye by using black light as the light source of excitation light.

Incidentally, in the method above, the catalyst metal particles are preferably subjected to a reduction treatment before evaluating the size of the catalyst metal particle. While metal particles having a particle diameter of 1 nm or less emit fluorescence, a metal oxide particles having the same size do not emit fluorescence. On the other hand, according to the reduction treatment, a metal oxide particle can be reduced to emit fluorescence, and the size of the catalyst metal particles can thereby be evaluated more accurately.

The present invention is described in greater detail below by referring to Examples, but needless to say, the scope of the present invention is not limited by these Examples.

EXAMPLES

Examples 1 and 2 and Comparative Example 1

In Examples 1 and 2 and Comparative Example 1, gold clusters were formed by a laser ablation method of gold target in acetone, and the gold clusters were supported on carrier particle to prepare a supported gold-cluster catalyst. The catalysts obtained in Examples 1 and 2 and Comparative Example 1 were evaluated for the fluorescence spectrum. The catalyst of Example 1 was evaluated also for the supporting rate in pore.

Example 1

Figure 1B:
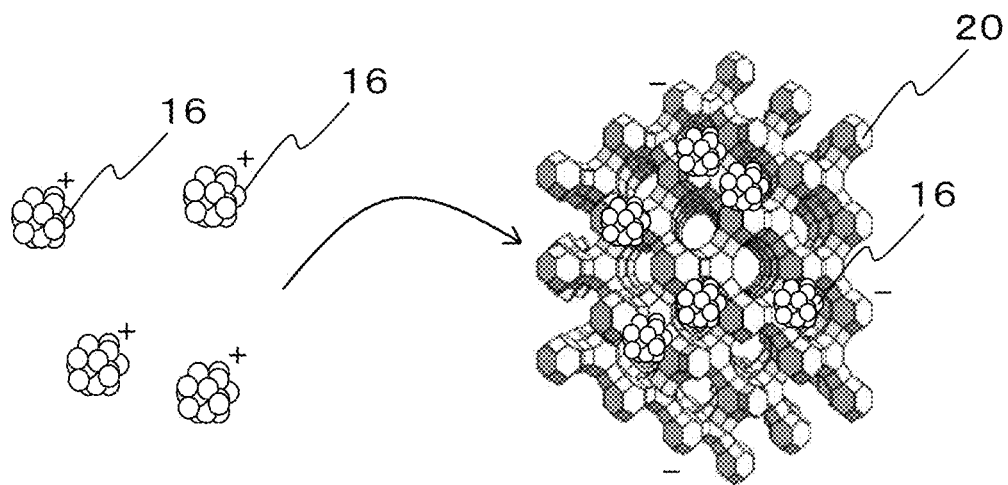

As illustrated in FIG. 1A, acetone 11 as a dispersion medium having dispersed therein carrier particles (not shown) was put in a vessel 13, a plate 12 of gold was placed in acetone 11, the plate 12 of gold in acetone 11 was irradiated with a laser 15 through a lens 14, and a gold cluster 16 was formed in the acetone by laser ablation. The thus-formed gold cluster 16 took on a positive charge and therefore, as illustrated in FIG. 1B, was electrically drawn to sites having a negative charge, i.e., acid sites, of the carrier particles of zeolite carrier particles 20, and supported there.

The laser light was the basic wave (1,064 nm, 10 Hz) of a Nd:YAG laser, and the intensity thereof was 2 W.

The carrier particles supporting the clusters were taken out from the acetone, dried at about 25° C. for about 1 hour, and fired at 300° C. for 2 hours to obtain the supported gold-cluster catalyst of Example 1.

In Example 1, the carrier particles and the laser irradiation time were as follows:

Carrier particle: ZSM-5 zeolite (MFI) (Si/Al ratio: 1,500)
Laser irradiation time: 2 hours and 45 minutes Example 2

The supported gold-cluster catalyst of Example 2 was obtained in the same manner as in Example 1 except that the carrier particles and the laser irradiation time were as follows:

Carrier particle: ZSM-5 zeolite (MFI) (Si/Al ratio: 1,500)
Laser irradiation time: 12 hours and 30 minutes Incidentally, since the ablation efficiency differs depending on the surface state of the carrier particles or the plate of gold, in Example 2 and Comparative Example 1, the laser ablation time was adjusted to provide the same amount of ablation of gold as in Example 1. The amount of ablation of gold was judged from the change in color of the dispersion medium.

Comparative Example 1

The supported gold-cluster catalyst of Comparative Example 1 was obtained in the same manner as in Example 1 except that the carrier particles and the laser irradiation time were as follows:

Carrier particle: fumed silica
Laser irradiation time: 30 minutes

<Evaluation: Fluorescence Spectrum>

Figure 2A:
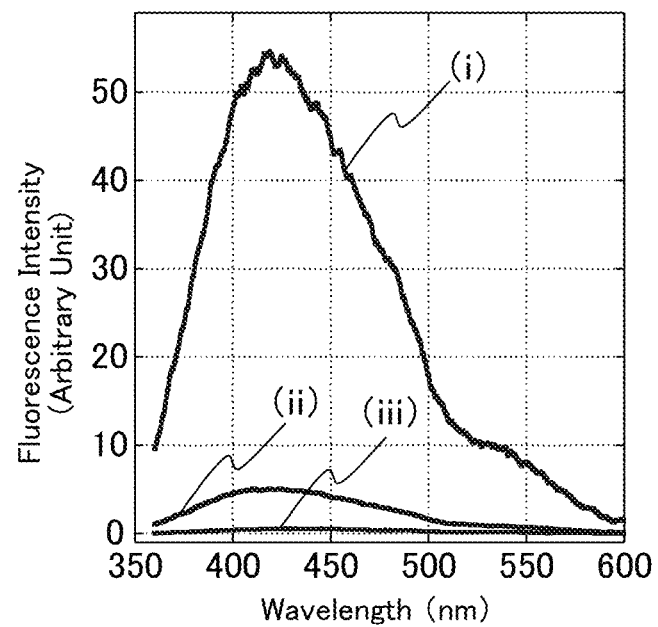
FIG. 2 is a graph illustrating the fluorescence spectra with respect to the supported gold-cluster catalysts of Examples 1 and 2 and Comparative Example 1.

With respect to the supported gold-cluster catalysts of Examples 1 and 2 and Comparative Example 1, the measurement of fluorescence spectrum (excitation wavelength: 350 nm) was performed. FIG. 2A depicts a graph illustrating the evaluation results of fluorescence spectrum normalized to the intensity per 1 mg of gold. In FIG. 2A, the result as to Example 1 is indicated by the spectrum (i), the result as to Example 2 is indicated by the spectrum (ii), and the result as to Comparative Example 1 is indicated by the spectrum (iii).

In FIG. 2A, the fluorescence signal at near 400 nm is a spectrum in which fluorescent emissions from the gold cluster of about 8-mer were overlapped. Accordingly, FIG. 2A indicates that in the supported gold-cluster catalysts of Examples 1 and 2, particularly, in the supported gold-cluster catalyst of Example 1, a relatively large amount of a gold cluster around 8-mer is supported on the carrier particle.

Figure 2B:
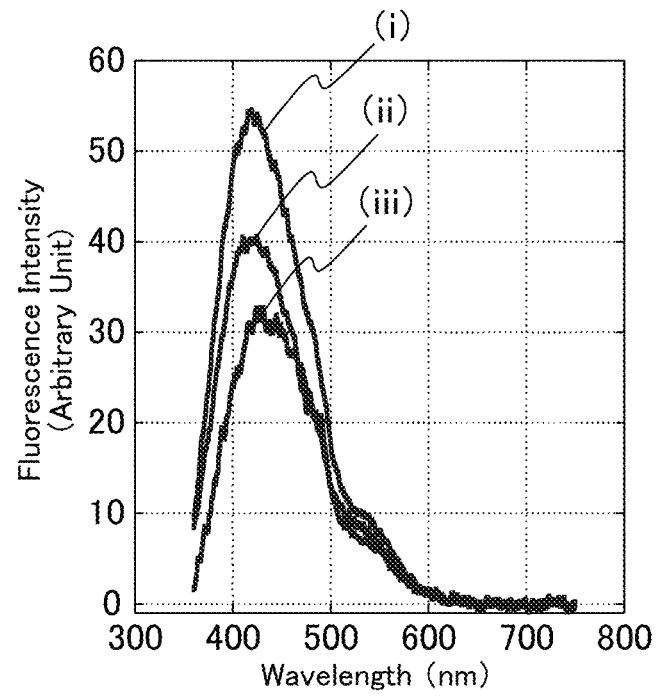

In FIG. 2B, for the sake of examination, based on the spectra of FIG. 2A, the result as to Example 1 (spectrum (i)) is depicted at 1-fold magnification, the result as to Example 2 (spectrum (ii)) is depicted at 8-fold magnification, and the result as to Comparative Example 1 (spectrum (iii)) is depicted at 60-fold magnification.

Compared with the results (spectra (i) and (ii)) as to Examples 1 and 2 where the gold clusters were supported on zeolite, the result (spectrum (iii)) as to Comparative Example 1 where the gold clusters were supported on fumed silica is shifted to the long wavelength side. Thus suggests that the particle diameter of the gold cluster supported on fumed silica of Comparative Example 1 is larger than that of the gold cluster supported on zeolite of Examples 1 and 2. Incidentally, the peak near 550 nm is derived from Mie scattering by nanoparticles attached to the carrier particle surface simultaneously with the clusters.

<Evaluation: Catalyst Metal Supporting Rate in Pore>

The supported gold-cluster catalyst of Example 1 was evaluated for the gold, as the catalyst metal, supporting rate in pore. The supporting rate in pores was 62.5 mol %.

Specifically, the catalyst metal supporting rate in pores was determined as follows:

Catalyst metal supporting rate in pores(mol %)=B/A

A: the number of atoms (mol/g) of all the catalyst metal supported on the carrier particles, B: the number of atoms (mol/g) of the catalyst metal supported on the carrier particles after the following treatments (i) to (iv):

(i) putting the cluster-supporting catalyst at a concentration of 4 mass % in an aqueous 1 M sodium chloride solution, followed by stirring at 80° C. for 10 days, (ii) after (i) above, rinsing the cluster-supporting catalyst with ion-exchanged water, (iii) after (ii) above, putting the cluster-supporting catalyst at a concentration of 4 mass % in an aqueous solution containing 6 mass % of polyoxyethylene sorbitan monolaurate (Tween 20 (trademark) of Tokyo Chemical Industry Co., Ltd.), 0.25 M trisodium ethylenediaminetetraacetate, and 0.01 M sodium borohydride, followed by stirring at 80° C. for 10 days, and (iv) after (iii) above, rinsing the catalyst with ion-exchanged water.

<Other Metals>

In Examples 1 to 2 and Comparative Example 1, a gold clusters were formed by using a gold target. In this connection, as to the following metals, it was confirmed that clusters of the metal can be formed in the same manner as in Example 1 by the method of laser ablation in liquid using the metal as the target:

Aluminum, silicon, titanium vanadium, chromium, manganese, iron, cobalt, nickel, copper, zinc, gallium, germanium zirconium niobium, silver, rhodium ruthenium, palladium, indium, tin, tantalum, tungsten, iridium, platinum, and cerium.

It was also confirmed that out of these metal clusters, as to copper, silver, rhodium, ruthenium palladium and platinum, fluorescence is observed upon irradiation with excitation light. In addition, it was confirmed that out of these metal clusters, as to copper, silver, rhodium, ruthenium and platinum, fluorescence is observed upon irradiation with excitation light also when clusters formed by the ion exchange-reduction method are supported on a zeolite carrier particle.

Example 3

In Example 3, a supported copper-cluster catalyst in which copper clusters are supported on a zeolite carrier particles was prepared in the same manner as in Example 1 except that a copper target was used in place of the gold target and a ZSM-5 zeolite carrier particles (MFI) (Si/Al ratio: 40) were used as the zeolite carrier particle. The obtained catalyst was evaluated for the fluorescence spectrum.

Unlike the gold, the copper is oxidized in air, and the copper cluster immediately after preparation was in the oxide state. Accordingly, the supported copper-cluster catalyst immediately after preparation did not emit fluorescence.

Figure 3:
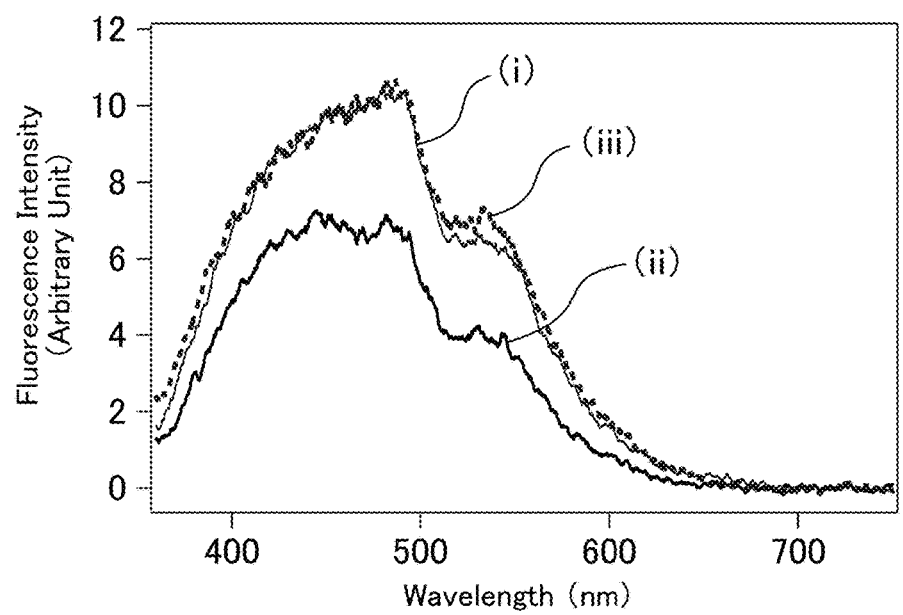
FIG. 3 depicts graphs illustrating the fluorescence spectra before oxidation treatment and reduction treatment with respect to the supported copper-cluster catalyst of Example 3.

Then, the obtained supported copper-cluster catalyst was heated at 300° C. for 2 hours in a hydrogen atmosphere, effecting a reduction treatment, and thereafter evaluated for the fluorescence intensity. Consequently, the supported copper-cluster catalyst subjected to a reduction treatment exhibited fluorescence. The result of the fluorescence intensity evaluation (excitation wavelength: 350 nm) is illustrated as the spectrum (i) in FIG. 3. In this spectrum (i), the fluorescence of 400 to 500 nm corresponds to the already-reported fluorescence signals of 8-mer and 9-mer of copper.

Subsequently, the supported copper-cluster catalyst was left standing overnight in an air atmosphere, effecting an oxidation treatment, and again evaluated for the fluorescence intensity. Consequently, the supported copper-cluster catalyst left standing in an air atmosphere exhibited fluorescence, though the intensity was weak compared with that before the treatment in an air atmosphere. The result of fluorescence intensity evaluation is illustrated as the spectrum (ii) in FIG. 3.

Subsequently, the supported copper-cluster catalyst left standing in an air atmosphere was again subjected to the above-described reduction treatment and again evaluated for the fluorescence intensity. Consequently, the supported copper-cluster catalyst again subjected to the reduction treatment exhibited the same fluorescence as that before the treatment in an air atmosphere. The result of the fluorescence intensity evaluation is illustrated as the spectrum (iii) in FIG. 3.

The supported copper-cluster catalyst after performing oxidation treatment and reduction treatment thus exhibited the same fluorescence as that before these treatments, and this suggests that the copper clusters are held within the pores of the zeolite carrier particles and in turn, a change such as aggregation of the copper clusters are not caused by these treatments.

Example 4 and Comparative Example 2

In Example 4 and Comparative Example 2, the rhodium cluster-supporting catalyst (Example 4) and a commercially available exhaust gas purification catalyst (Comparative Example 2) were evaluated for the catalytic activity.

Specifically, Example 4 and Comparative Example 2 were conducted as follows.

Example 4

In Example 4, rhodium clusters were supported on a zeolite carrier particles in the same manner as in Example 1 except that a rhodium target was used in place of the gold target and a beta-type zeolite carrier particles (BEA) (Si/Al ratio: 40) were used as the zeolite carrier particle.

The temperature ($T_{CO(50\%)}$) when consuming 50% of the supplied carbon monoxide was evaluated by repeating an operation of heating 30 mg of the obtained rhodium cluster-supporting catalyst ($Rh_{cluster}$/BEA) for about 24 hours in an electric furnace at a heating rate of 12° C./min to a peak heating temperature of 640 to 800° C. from room temperature while flowing an evaluation gas having the following composition over the catalyst, and cooling it to room temperature.

Carbon monoxide (CO): 0.3%
Oxygen ($O_2$): 8%
Helium (He): balance

Figure 4:
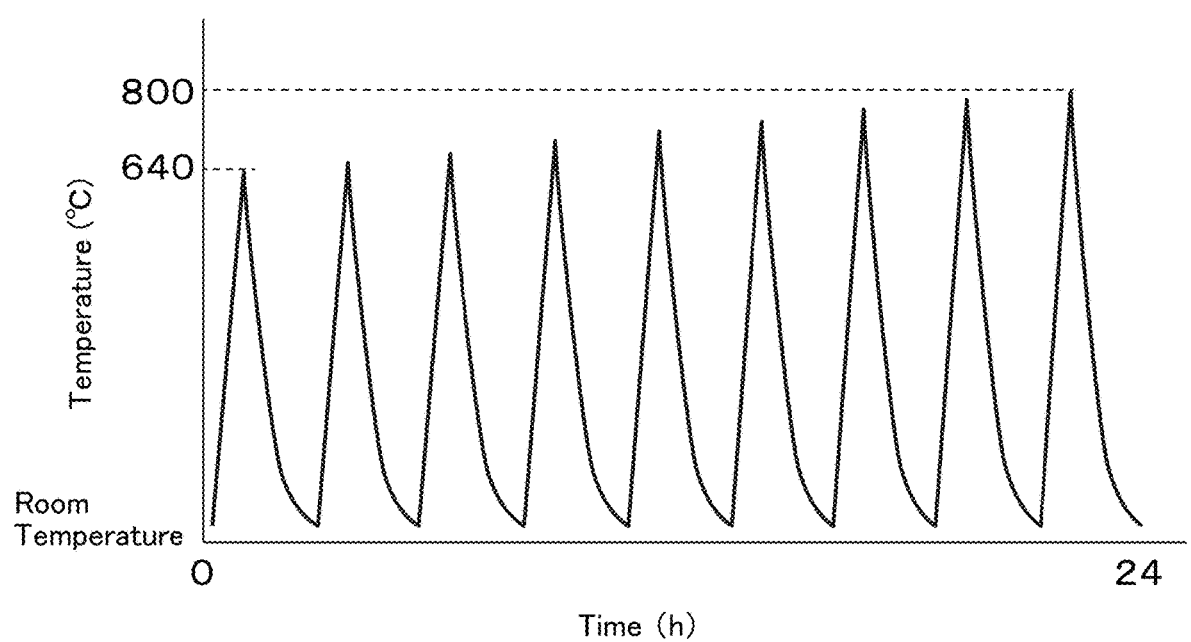
FIG. 4 is a graph illustrating the temperature change for the evaluation of catalytic activity.

With respect to the temperature change in the above-described repetitive step of heating and cooling, as illustrated in FIG. 4, the peak heating temperature becomes higher as it goes to the latter half, and a total of about 24 hours was spent.

In the repetitive step of heating and cooling, the evaluation was performed while raising the evaluation gas temperature to the peak heating temperature, i.e., in the temperature rising process. Similarly, in the repetitive step of heating and cooling, the evaluation was performed while lowering the evaluation gas temperature from the peak heating temperature, i.e., in the temperature dropping process.

Comparative Example 2

For reference, with respect to a commercially available exhaust gas purification catalyst ($Rh/Al_2O_3$—$CeO_2$—$ZrO_2$) as Comparative Example 2, the evaluations in the temperature rising process and the temperature dropping process were performed in the same manner as in Example 4.

<Evaluation: Durability>

Figure 5A:
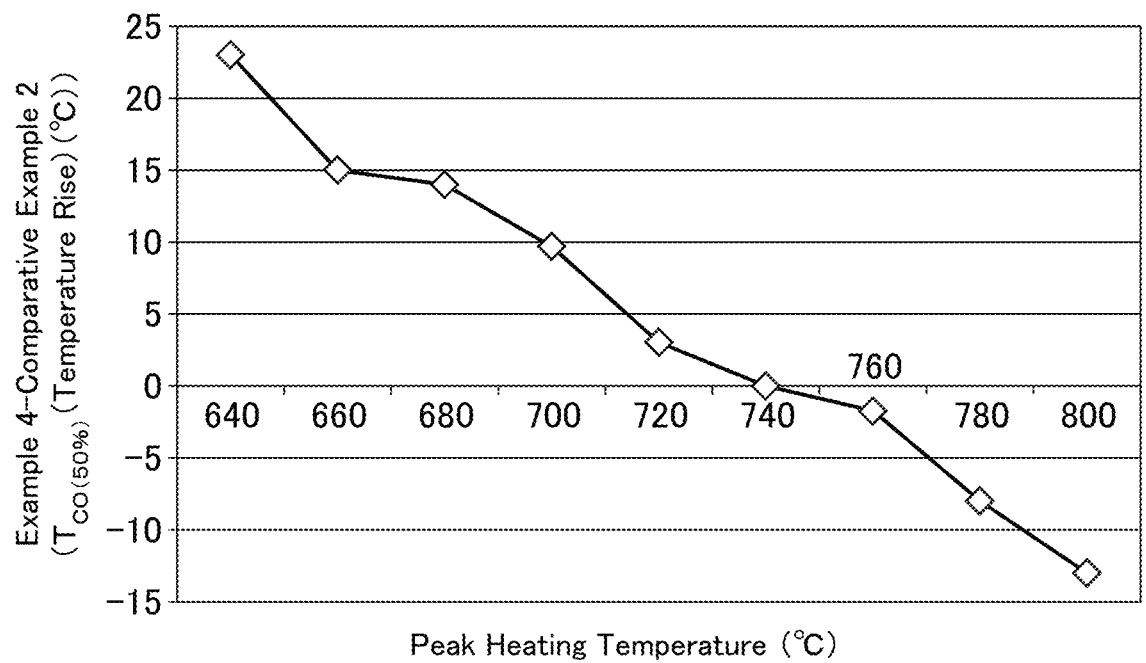
FIG. 5A is the results of the temperature rising process and FIG. 5B is the results of the temperature dropping process.
Figure 5B:
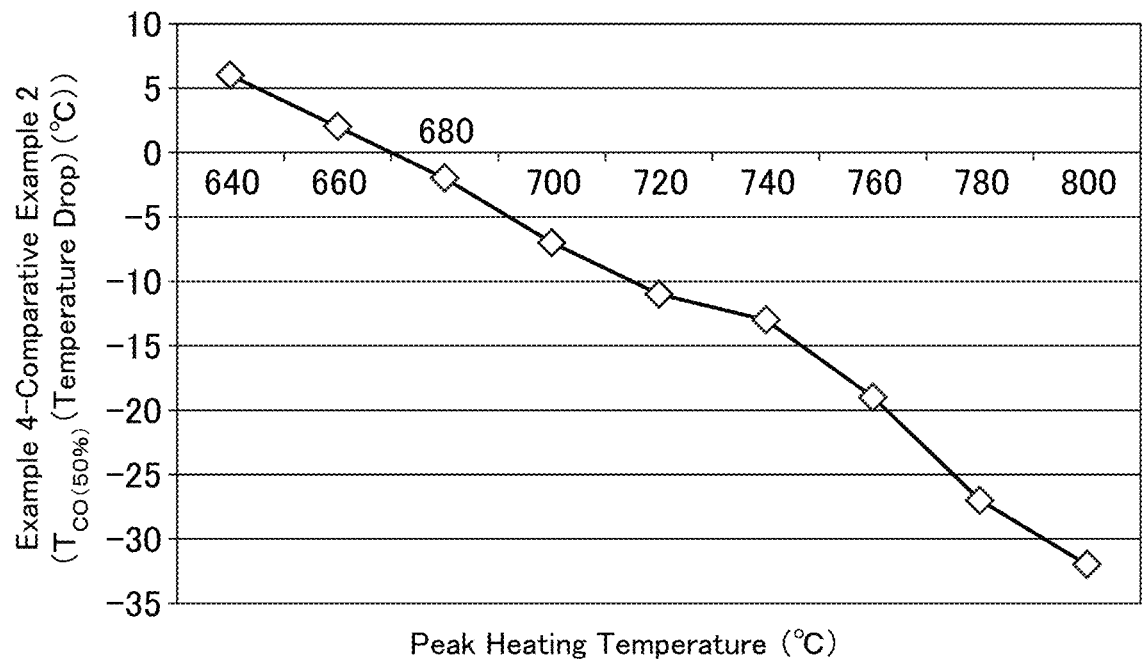

The evaluation results in the temperature rising process and the temperature dropping process are illustrated respectively in FIGS. 5A and 5B as the difference between the result of Example 4 and the result of Comparative Example 2 ($T_{CO(50\%)}$ of Example 4)-($T_{CO(50\%)}$ of Comparative Example 2). When the difference above takes a minus value, this indicates that $T_{CO(50\%)}$ of Example 4 is lower than $T_{CO(50\%)}$ of Comparative Example 2, i.e., the low-temperature activity of the catalyst of Example 4 is excellent. In FIG. 5, the abscissa indicates the temperature (the peak temperature in FIG. 4) at which an accelerated deterioration treatment was performed.

It is understood from FIGS. 5A and 5B that the catalyst of Example 4 provides an excellent exhaust gas purification performance relative to the catalyst of Comparative Example 2 as the peak heating temperature becomes higher. This indicates that the catalyst of Example 4 is less likely to deteriorate compared with the catalyst of Comparative Example 2.

Although not to be bound by theory, it is considered that in the catalyst of Comparative Example 2, rhodium of various sizes ranging from the monoatomic level to the submicrometer level was supported on the carrier to randomly cause sintering of rhodium particles by heat at the peak heating temperature and the catalyst was thereby deteriorated, whereas in the catalyst of Example 4, rhodium clusters were stably maintained within the pores of zeolite and in turn, the catalyst was not deteriorated due to heat at the peak heating temperature.

Incidentally, the change when the peak heating temperature is 640° C. and 660° C. is a change in the firing process of removing water molecules adsorbed to zeolite and therefore, the catalytic activity needs to be evaluated from the change substantially when the peak heating temperature is 700° C. or more.

Example 5 and Comparative Example 3

In Example 5 and Comparative Example 3, a catalyst in which rhodium clusters are supported on zeolite carrier particles or fumed silica carrier particles was obtained, and with respect to the obtained catalysts, the durability of the catalyst was evaluated.

Specifically, Example 5 and Comparative Example 3 were conducted as follows.

Example 5

In Example 5, rhodium clusters were supported on zeolite carrier particles in the same manner as in Example 1 except that a rhodium target was used in place of the gold target and beta-type zeolite carrier particles (BEA) (Si/Al ratio: 40) were used as the zeolite carrier particle.

With respect to the obtained rhodium cluster-supporting catalyst ($Rh_{cluster}$/BEA), the temperature ($T_{CO(50\%)}$) when consuming 50% of the supplied carbon monoxide was evaluated in the temperature rising process and in the temperature dropping process in the same manner as in Example 4.

Comparative Example 3

In Comparative Example 3, rhodium clusters were supported on a fumed silica particle in the same manner as in Example 1 except that a rhodium target was used in place of the gold target and a fumed silica particle was used as the carrier particle.

With respect to this rhodium cluster-supporting catalyst ($Rh_{cluster}$/silica), the temperature ($T_{CO(50\%)}$) when consuming 50% of the supplied carbon monoxide was evaluated in the temperature rising process and in the temperature dropping process in the same manner as in Example 4.

<Evaluation: Durability>

Figure 6A:
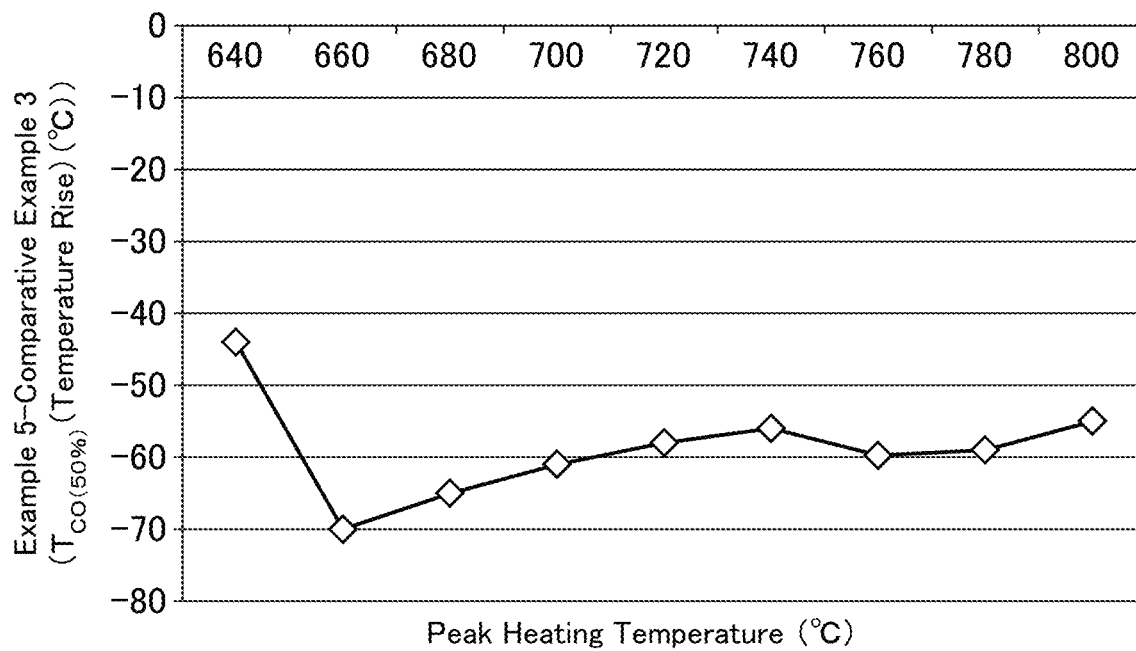
FIG. 6A is the results of the temperature rising process and FIG. 6B is the results of the temperature dropping process.
Figure 6B:
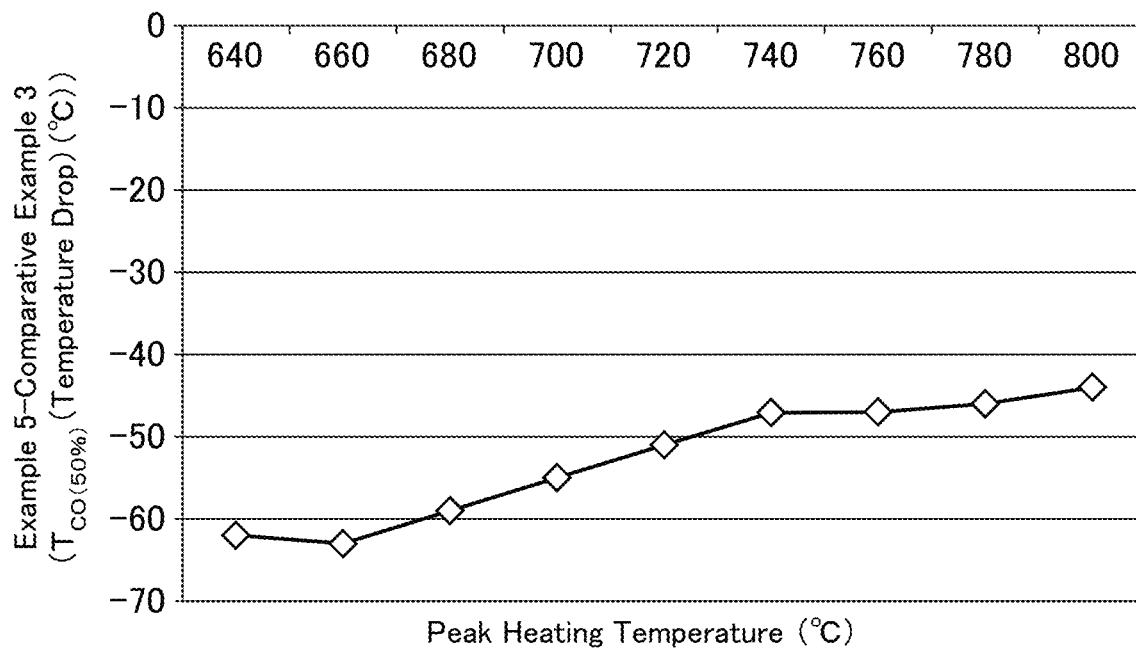

The evaluation results in the temperature rising process and the temperature dropping process are illustrated respectively in FIGS. 6A and 6B as the difference between the result of Example 5 and the result of Comparative Example 3 ($T_{CO(50\%)}$ of Example 5)-($T_{CO(50\%)}$ of Comparative Example 3). When the difference above takes a minus value, this indicates that $T_{CO(50\%)}$ of Example 5 is lower than $T_{CO(50\%)}$ of Comparative Example 3, i.e., the low-temperature activity of the catalyst of Example 5 is excellent. In FIG. 6, the abscissa indicates the temperature (the peak temperature in FIG. 4) at which an accelerated deterioration treatment was performed.

It is understood from FIGS. 6A and 6B that the catalyst ($Rh_{cluster}$/BEA) of Example 5 in which rhodium clusters are supported on beta-type zeolite carrier particles (BEA) has a significantly excellent low-temperature activity at all peak heating temperatures, compared with the catalyst ($Rh_{cluster}$/silica) of Comparative Example 3 in which rhodium clusters are supported on a fumed silica carrier particle.

Although not to be bound by theory, this is considered to be attributable to the fact that since fumed silica used in the catalyst of Comparative Example 3 does not have a pore, the rhodium clusters were supported only on the surface thereof and in the process of the rhodium being supported on the carrier and/or during the accelerated deterioration treatment, the rhodium cluster underwent aggregation or grain growth, i.e., the fact that while the rhodium cluster of the catalyst of Example 5 is stably maintained within the pores of the zeolite carrier, the rhodium cluster of the catalyst of Comparative Example 3 is present on the outer surface of the fumed silica carrier.

Example 6 and Comparative Example 4

In Example 6 and Comparative Example 4, a catalyst was obtained by supporting or not supporting a rhodium cluster on zeolite carrier particles, and the obtained catalysts were evaluated for the durability.

Specifically, Example 6 and Comparative Example 4 were conducted as follows.

Example 6

In Example 6, rhodium clusters were supported on zeolite carrier particles in the same manner as in Example 1 except that a rhodium target was used in place of the gold target and ZSM-5 zeolite carrier particles (MFI) (Si/Al ratio: 40) were used as the zeolite carrier particle.

With respect to the obtained rhodium cluster-supporting catalyst ($Rh_{cluster}$/MFI), the temperature ($T_{CO(50\%)}$) when consuming 50% of the supplied carbon monoxide was evaluated in the temperature rising process and in the temperature dropping process in the same manner as in Example 4.

Comparative Example 4

In Comparative Example 4, rhodium clusters were dispersed in acetone in the same manner as in Example 1 except that a rhodium target was used in place of the gold target and carrier particles was not used. Thereafter, at the stage where the rhodium clusters were aggregated to form a rhodium cluster aggregate particles, ZSM-5 zeolite carrier particles (MFI) (Si/Al ratio: 40) was added as the zeolite carrier particles to the acetone to prepare the catalyst ($Rh_{particle}$/MFI) of Comparative Example 4 in which the rhodium cluster aggregate particle was supported on the ZSM-5 zeolite carrier particles (MFI).

With respect to this rhodium aggregate particle-supported catalyst ($Rh_{particle}$/MFI), the temperature ($T_{CO(50\%)}$) when consuming 50% of the supplied carbon monoxide was evaluated in the temperature rising process and in the temperature dropping process in the same manner as in Example 4.

<Evaluation: Durability>

Figure 7A:
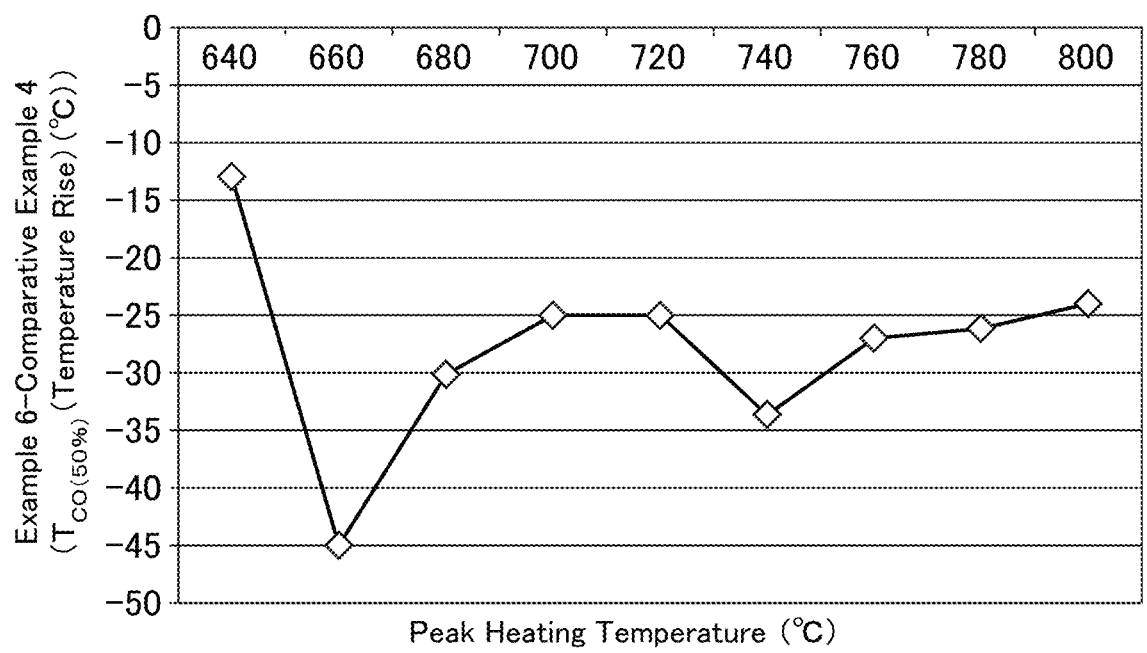
FIG. 7A is the results of the temperature rising process and FIG. 7B is the results of the temperature dropping process.
Figure 7B:
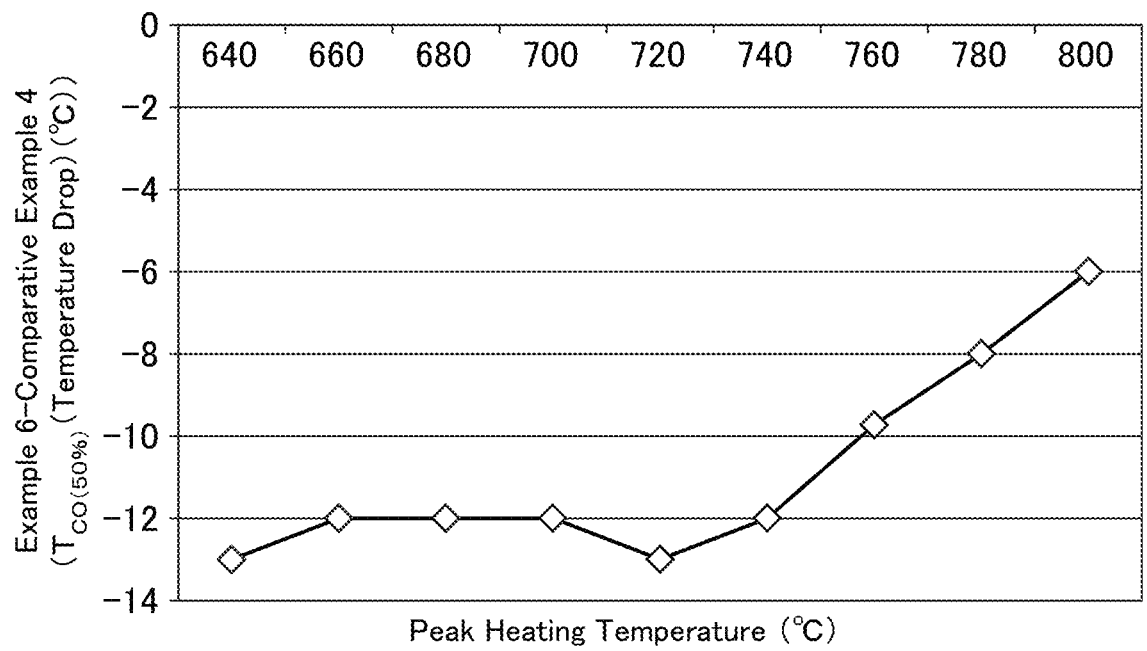

The evaluation results in the temperature rising process and the temperature dropping process are illustrated respectively in FIGS. 7A and 7B as the difference between the result of Example 6 and the result of Comparative Example 4 ($T_{CO(50\%)}$ of Example 6)-($T_{CO(50\%)}$ of Comparative Example 4). When the difference above takes a minus value, this indicates that $T_{CO(50\%)}$ of Example 6 is lower than $T_{CO(50\%)}$ of Comparative Example 4, i.e., the low-temperature activity of the catalyst of Example 6 is excellent. In FIG. 7, the abscissa indicates the temperature (the peak temperature in FIG. 4) at which an accelerated deterioration treatment was performed.

It is understood from FIGS. 7A and 7B that the catalyst ($Rh_{cluster}$/MFI) of Example 6 in which rhodium clusters are supported on a ZSM-5 zeolite carrier particles (MFI) has a significantly excellent low-temperature activity at all peak heating temperatures, compared with the catalyst ($Rh_{particle}$/MFI) of Comparative Example 4 in which a rhodium cluster aggregate particles are supported on a ZSM-5 zeolite carrier particles (MFI).

Although not to be bound by theory, this is considered to be attributable to the fact that since the particle diameter of the rhodium cluster used in the catalyst of Example 6 is significantly smaller than the particle diameter of the rhodium cluster aggregate particle used in the catalyst of Comparative Example 4, a low-temperature catalytic activity specific to clusters was exhibited and a relatively large surface area could be provided for the catalytic reaction.

Examples 7 to 10

In Examples 7 to 10, a catalyst was obtained by supporting a rhodium cluster on zeolite carrier particles, and the obtained catalysts were evaluated for the durability.

Specifically, Examples 7 to 10 were conducted as follows.

In Examples 7 to 10, rhodium clusters were supported on zeolite carrier particles in the same manner as in Example 1 except that a rhodium target was used in place of the gold target and the following carrier particles were used as the zeolite carrier particle.

Example 7: ZSM-5 zeolite carrier particles (MFI) (Si/Al ratio: 1,500)

Example 8: beta-type zeolite carrier particles (BEA) (Si/Al ratio: 1,500)

Example 9: beta-type zeolite carrier particles (BEA) (Si/Al ratio: 40)

Example 10: ZSM-5 zeolite carrier particles (MFI) (Si/Al ratio: 40)

With respect to the obtained rhodium cluster-supporting catalysts of Examples 7 to 10, the temperature ($T_{CO(50\%)}$) when consuming 50% of the supplied carbon monoxide was evaluated in the temperature rising process and in the temperature dropping process in the same manner as in Example 4.

<Evaluation: Durability>

Figure 8A:
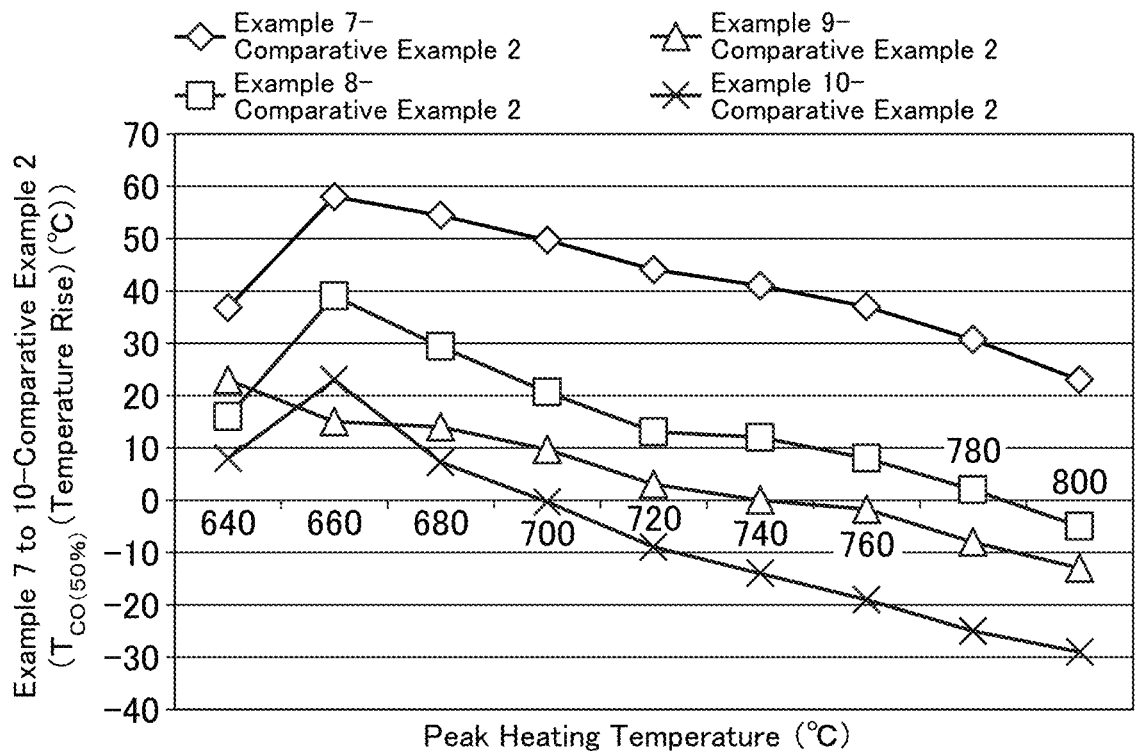
FIG. 8A is the results of the temperature rising process and FIG. 8B is the results of the temperature dropping process.
Figure 8B:
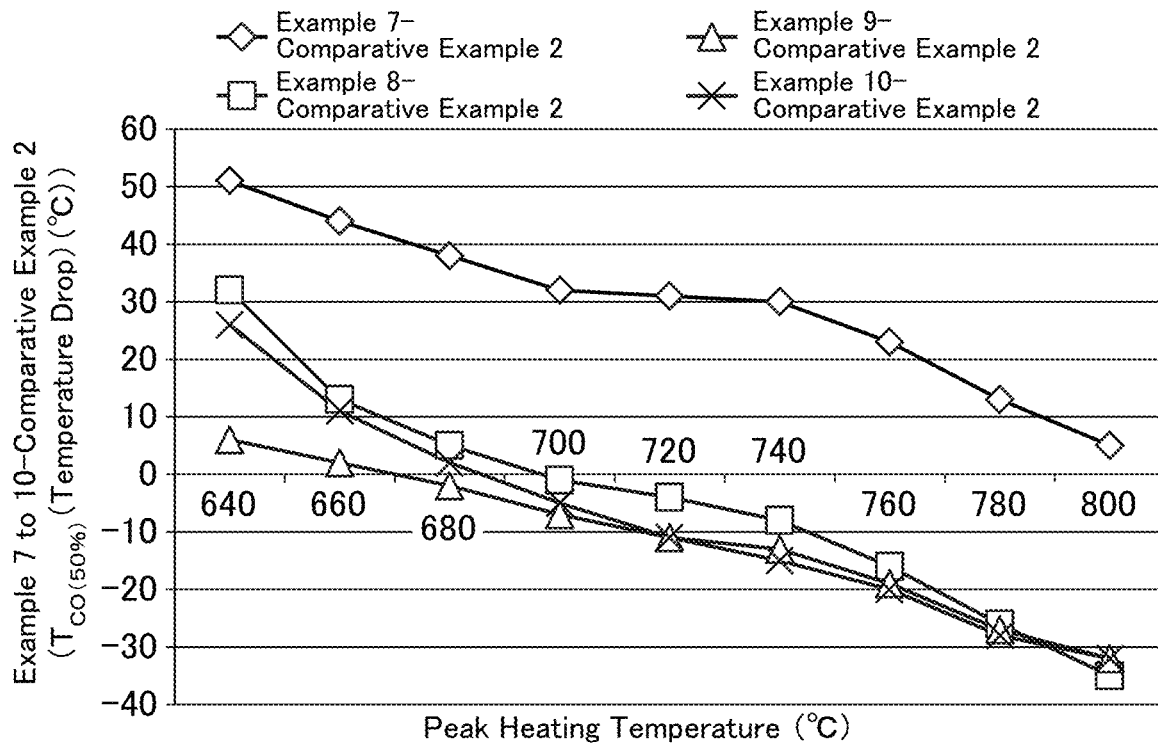

The evaluation results in the temperature rising process and the temperature dropping process are illustrated respectively in FIGS. 8A and 8B as the difference between the results of Examples 7 to 10 and the result of Comparative Example 2 (commercially available exhaust gas purification catalyst) ($T_{CO(50\%)}$ of Examples 7 to 10)-($T_{CO(50\%)}$ of Comparative Example 2). When the difference above takes a minus value, this indicates that $T_{CO(50\%)}$ of Examples 7 to 10 is lower than $T_{CO(50\%)}$ of Comparative Example 2, i.e., the low-temperature activity of the catalysts of Examples 7 to 10 is excellent. In FIG. 8, the abscissa indicates the temperature (the peak temperature in FIG. 4) at which an accelerated deterioration treatment was performed.

It is understood from FIGS. 8A and 8B that the catalysts of Examples 7 to 10 provides an excellent or equivalent exhaust gas purification performance relative to the catalyst of Comparative Example 2 as the peak heating temperature becomes higher. This indicates that the catalysts of Examples 7 to 10 are less likely to deteriorate compared with the catalyst of Comparative Example 2.

Although not to be bound by theory, this is considered to be attributable to the fact that in the catalyst of Comparative Example 2, rhodium of various sizes ranging from the monoatomic level to the submicrometer level was supported on the carrier to randomly cause sintering of rhodium particles by heat at the peak heating temperature and the catalyst was thereby deteriorated, whereas in the catalysts of Examples 7 to 10, rhodium clusters were stably maintained within the pores of zeolite and in turn, the catalyst was not deteriorated due to heat at the peak heating temperature.

Incidentally, the catalyst of Example 7 showed a poor catalyst performance in the temperature range of up to 800° C. compared with the catalyst of Comparative Example 2, but it is clearly understood from the curves of FIGS. 8A and 8B that when the accelerated deterioration treatment is further continued, the performance of the catalyst of Example 7 surpasses the performance of the catalyst of Comparative Example 2.

Reviewing Examples 7 and 10 using a ZSM-5 zeolite carrier particles (MFI) as the carrier, the catalyst of Example 10 using ZSM-5 zeolite carrier particles (MFI(40)) having an Si/Al ratio of 40 exhibited good catalyst performance, compared with the catalyst of Example 7 using ZSM-5 zeolite carrier particles (MFI(1500)) having an Si/Al ratio of 1,500. This is considered to occur because the ZSM-5 zeolite carrier particles (MFI(40)) having an Si/Al ratio of 40 has a larger number of acid sites than the ZSM-5 zeolite carrier particles (MFI(1500)) having an Si/Al ratio of 1,500 and supporting of the rhodium cluster on the zeolite carrier particles was successfully performed by an electrostatic action.

Reviewing Examples 8 and 9 using a beta-type zeolite as the carrier, similarly to the case of MFI zeolite, the catalyst of Example 9 using a beta-type zeolite carrier particles (BEA(40)) having an Si/Al ratio of 40, i.e., a zeolite carrier particles having a relatively large number of acid sites exhibited good catalyst performance, compared with the catalyst of Example 8 using beta-type zeolite carrier particles (BEA(1500)) having an Si/Al ratio of 1,500, i.e., zeolite carrier particles having a relatively small number of acid sites.

However, in the case of using beta-type zeolite carrier particles (BEA), the difference in the catalyst performance due to the different in the Si/Al ratio was not so large as in the case of using ZSM-5 zeolite carrier particles (MFI). This is considered to occur because the beta-type zeolite carrier particle (BEA) substantially has a large surface solid acid strength and the effect of the difference in the amount of acid sites was less likely to develop.

For reference, the zeta potential (indicator of solid acid strength) of the zeolite carrier particles used in Examples 7 to 10 is as follows:

Example 7: ZSM-5 zeolite carrier particle (MFI(1500)): −72.7 mV

Example 8: beta-type zeolite carrier particle (BEA (1500)): −96.8 mV

Example 9: beta-type zeolite carrier particle (BEA(40)): −117 mV

Example 10: ZSM-5 zeolite carrier particle (MFI(40)):−87 mV

That is, it is considered that in the case of a beta-type zeolite carrier particle (BEA), despite a large Si/Al ratio, the zeolite potential was low and supporting of the rhodium cluster on the zeolite carrier particle was thereby successfully performed by an electrostatic action.

In order to confirm this understanding, a rhodium particle was supported on MFI(40) (zeta potential: −87 mV) and on MFI(1500) (zeta potential: −72.7 mV) by laser ablation in liquid, as a result, coloring of the carrier caused by the supporting of rhodium particle on the carrier particle occurred more prominently in MFI(40) than in MFI(1500).

It is understood from this result that in the case of MFI(40) having a relatively small zeta potential, i.e., relatively large acid strength, the rhodium particle was supported on the carrier particle in a relatively successful manner through an electrostatic interaction between the rhodium particle and acid sites of the carrier particle.

Examples 11 and 12

In Examples 11 and 12, a supported copper-cluster catalyst was obtained by a method of reduction in liquid, and the obtained catalysts were evaluated by means of fluorescence.

Example 11

In Example 11, a zeolite carrier particle was dispersed in 2-propanol to produce a zeolite carrier particle dispersion liquid, and copper(II) chloride as a copper ion source and sodium borohydride ($NaBH_4$) as a reducing agent were mixed with the dispersion liquid to synthesize a copper cluster in the dispersion liquid. The thus-synthesized copper cluster had a positive charge and was thereby electrically drawn to acid sites of the zeolite carrier particle and supported thereon.

Figure 9:
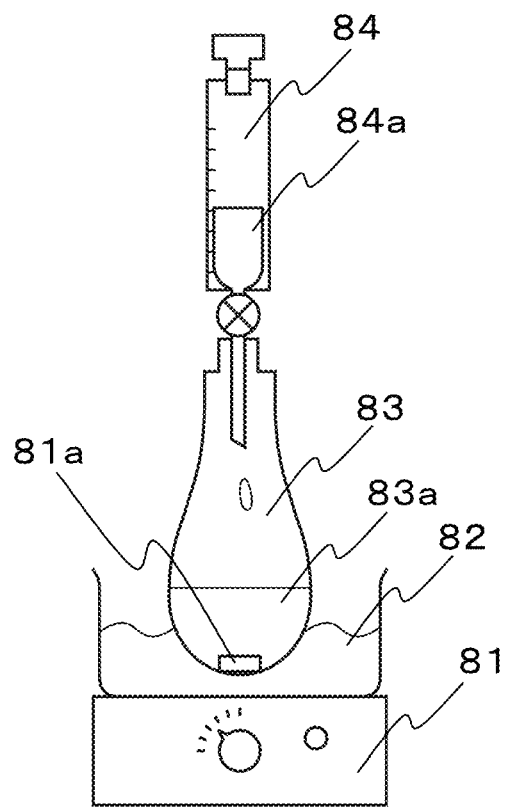
FIG. 9 is a diagrammatic view of the apparatus used in the preparation of clusters by a method of reduction in liquid.

Specifically, copper(II) chloride and sodium borohydride were mixed using the apparatus illustrated in FIG. 9.

More specifically, a water bath 82 at about 10° C. was disposed on a magnetic stirrer 81, a flask 83 was disposed thereon, a dropping funnel 84 was disposed on the flask 83, and the contents 84a of the dropping funnel 84 were added dropwise to the contents 83a of the flask 83 with stirring by means of a stirring bar 81a. The dropwise addition was performed for 1 hour while keeping the temperature by the water bath, and after the completion of dropwise addition, stirring was further performed for 1 hour while keeping the temperature by the water bath. Thereafter, stirring was further performed at room temperature for 2 hours, and the contents of the flask were then filtered and fired at a temperature of 300° C. for 2 hours in the atmosphere to obtain the supported copper-cluster catalyst of Example 11.

The contents 84a of the dropping funnel 84 and the contents 83a of the flask 83 in Example 11 are shown together in Table 1 below.

Example 12

The supported copper-cluster catalyst of Example 12 was obtained in the same manner as in Example 11 except that the contents 84a of the dropping funnel 84 and the contents 83a of the flask 83 were changed as shown in Table 1 below.

TABLE 1

| | Example 11 | | Example 12 | |
|---|---|---|---|---|
| Dropping funnel | sodium borohydride | 25 μmol | copper chloride | 12 μmol |
| | 2-propanol | 10 mL | 2-propanol | 5 mL |
| Flask | copper chloride | 12 μmol | sodium borohydride | 80 μmol |
| | zeolite carrier particle | 200 mg | zeolite carrier particle | 200 mg |
| | 2-propanol | 200 mL | 2-propanol | 200 mL |

<Evaluation: Fluorescence Spectrum>

The supported copper-cluster catalysts prepared in Examples 11 and 12 and as reference samples, a copper ion-exchanged zeolite carrier particle and a proton-type zeolite carrier particle were measured for the fluorescence spectrum at an excitation wavelength of 350 nm. The results are illustrated in FIG. 10.

Figure 10:
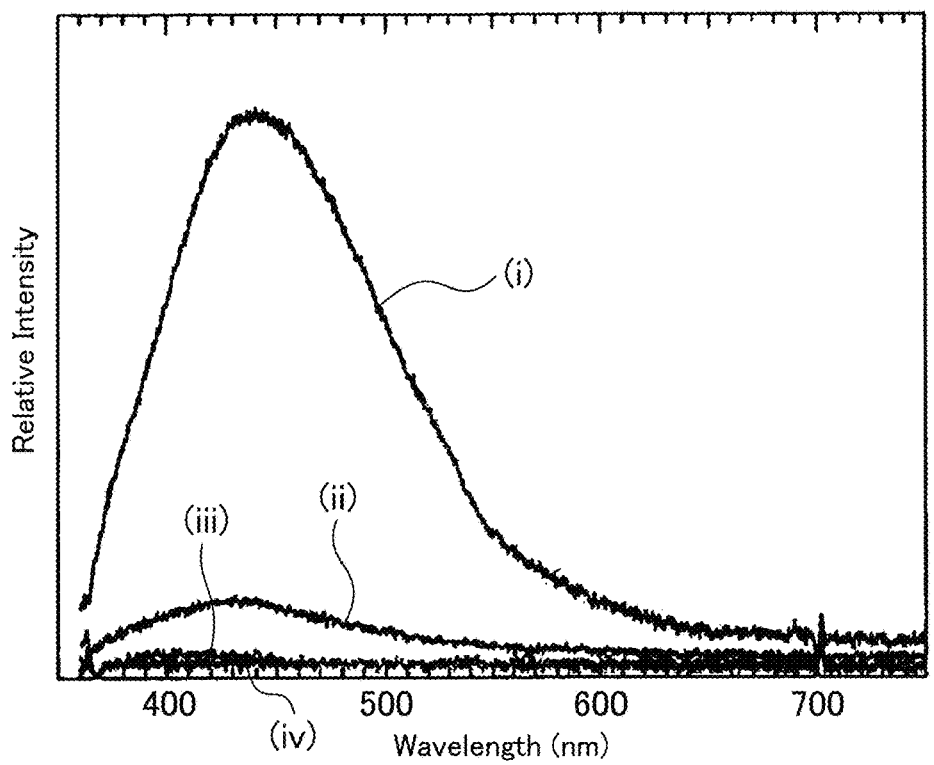
FIG. 10 is a graph illustrating the fluorescence spectra (excitation wavelength: 350 nm) with respect to samples prepared in Examples 11 and 12 in which clusters are prepared by a method of reduction in liquid, and copper ion-exchanged zeolite carrier particles as a reference sample.

In FIG. 10, the result as to Example 11 is indicated by the spectrum (i), the result as to Example 12 is indicated by the spectrum (ii), the result as to the copper ion-exchanged zeolite carrier particle as a reference sample is indicated by the spectrum (iii), and the result as to the proton-type zeolite carrier particle as a reference sample is indicated by the spectrum (iv).

As understood from FIG. 10, the supported copper-cluster catalysts obtained in Examples 11 and 12, particularly in Example 11, showed a peak at about 440 nm. This peak is considered to be derived from the copper clusters. In the supported copper-cluster catalyst obtained in Example 11, the peak above is as broad as having a half width of about 100 nm and is considered to be derived from the copper clusters.

<Evaluation: Fluorescence Spectrum>

In addition, the supported copper-cluster catalyst obtained in Example 11 was measured for the fluorescence spectrum at an excitation wavelength of 350 nm and the excitation spectrum at a fluorescence monitor wavelength of 440 nm and 520 nm. The results are illustrated in FIG. 11.

Figure 11:
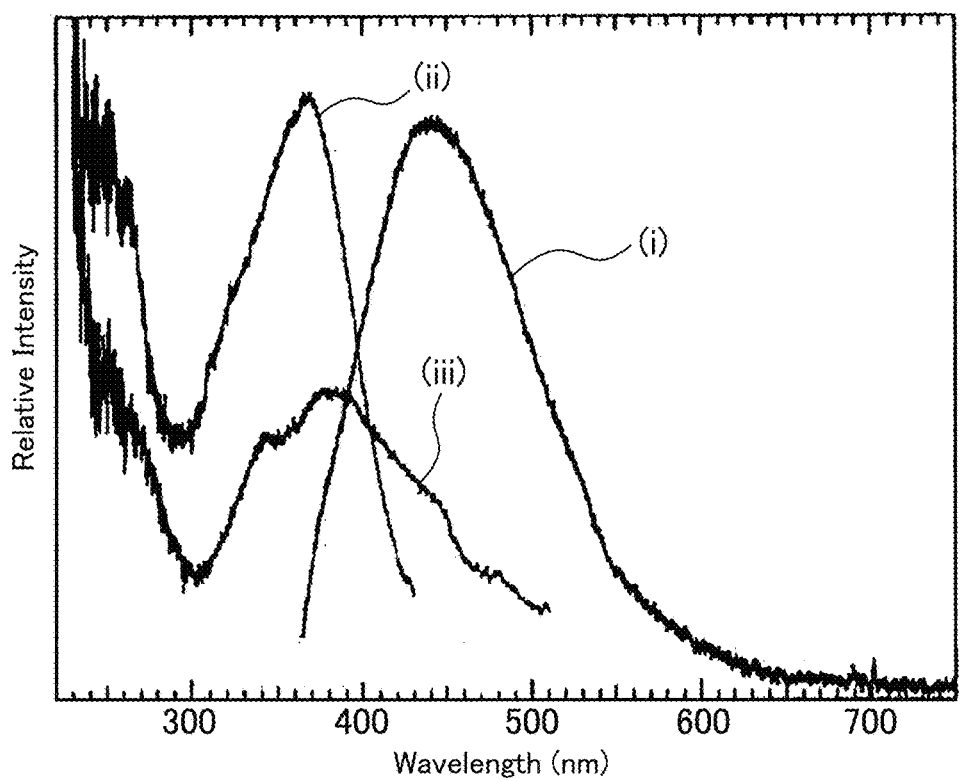
FIG. 11 is a graph illustrating the fluorescence spectrum (excitation wavelength: 350 nm) and the fluorescence spectra (fluorescence monitor wavelength: 440 nm, 520 nm) with respect to Example 11 in which clusters are prepared by a method of reduction in liquid.

In FIG. 11, the result as to the excitation wavelength of 350 nm is indicated by the fluorescence spectrum (i), the result as to the fluorescence monitor wavelength of 440 nm is indicated by the spectrum (ii), and the result as to the fluorescence monitor wavelength of 520 nm is indicated by the spectrum (iii).

In FIG. 11, fluorescence specific to the copper clusters are observed, and it is therefore understood that the copper clusters are supported on the carrier particle.

Example 13 and Comparative Example 5

In Example 13 and Comparative Example 5, rhodium cluster-supporting catalysts were obtained by using a method of laser ablation in liquid and an ion exchange-reduction method, respectively.

Example 13

In Example 13, rhodium clusters were supported on a zeolite carrier particle by a method of laser ablation in liquid in the same manner as in Example 1 except that a rhodium target was used in place of the gold target and ZSM-5 zeolite carrier particles (Si/Al ratio: 40) were used as the zeolite carrier particle.

Comparative Example 5

In Comparative Example 5, a rhodium ion was supported on ZSM-5 zeolite carrier particles (Si/Al ratio: 40) by ion exchange, and then a metallic rhodium particle was supported on the zeolite carrier particle by reducing the rhodium ion, whereby rhodium clusters were supported on the zeolite carrier particle (ion exchange-reduction method). $Rh(NO_3)_3$ was used as a rhodium ion source and $NaBH_4$ was used as a reducing agent.

<Evaluation: Fluorescence Spectrum>

The supported catalysts of Example 13 and Comparative Example 5 were measured for the fluorescence spectrum (excitation wavelength: 350 nm). The evaluation results of fluorescence spectrum normalized to the intensity per 1 mg of rhodium are illustrated in FIG. 12.

Figure 12:
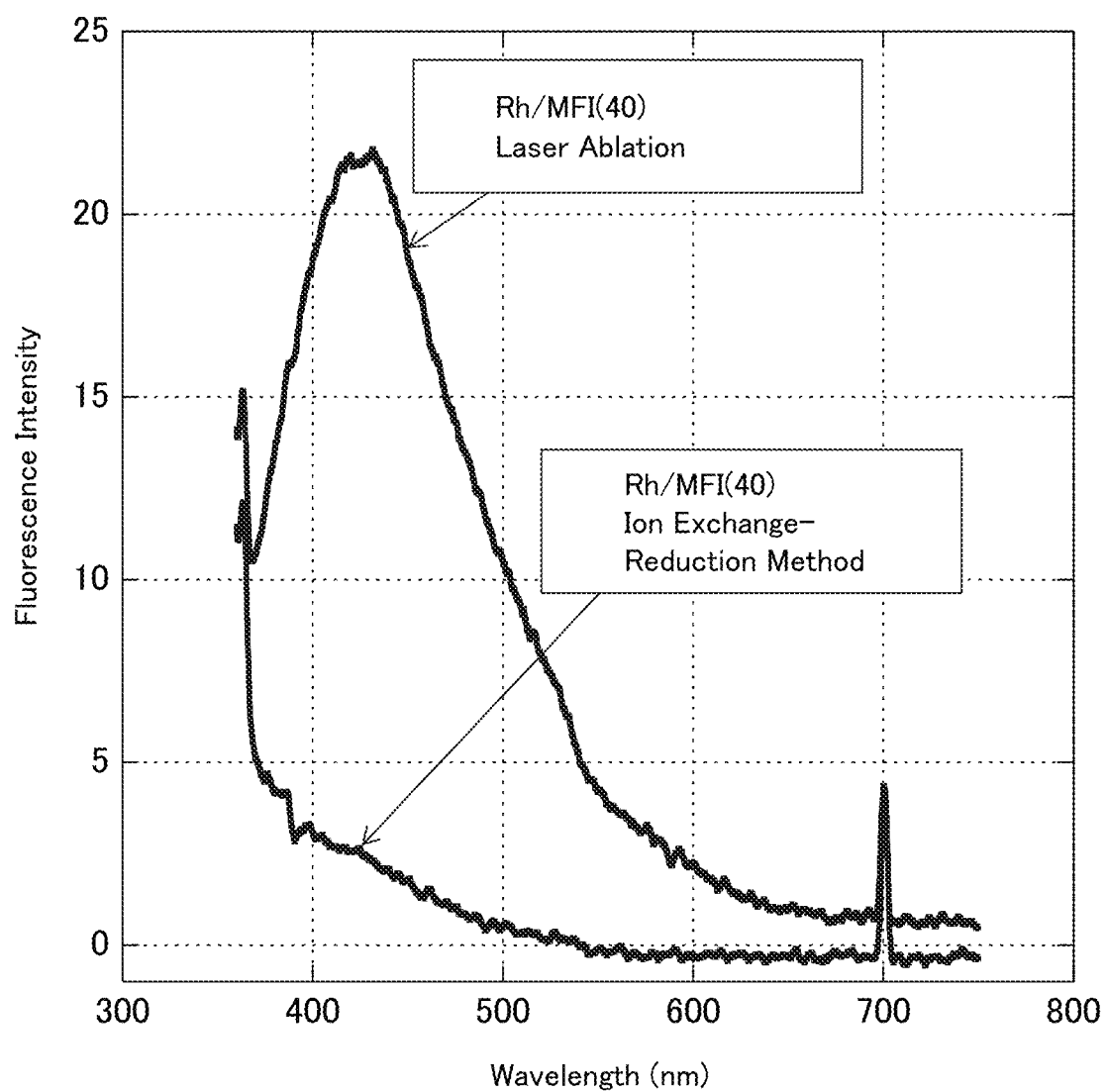
FIG. 12 is a graph illustrating the fluorescence spectra of the rhodium cluster-supporting catalysts of Example 13 and Comparative Example 5 prepared by a method of laser ablation in liquid and an ion exchange-reduction method, respectively.

It is understood from FIG. 12 that compared with Comparative Example 5 using an ion exchange-reduction method, in Example 13 using laser ablation in liquid, the fluorescence peak is large, i.e., a relatively large number of rhodium particles are supported in the cluster state on the zeolite carrier particle.

Example 14 and Comparative Example 6

In Example 14 and Comparative Example 6, supported gold-cluster catalysts were obtained by using a method of laser ablation in liquid and an ion exchange-reduction method, respectively.

Example 14

In Example 14, gold clusters were supported on a zeolite carrier particle by a method of laser ablation in liquid in the same manner as in Example 1 except that ZSM-5 zeolite carrier particles (MFI) (Si/Al ratio: 1,500) were used as the zeolite carrier particle.

Comparative Example 6

In Comparative Example 6, a gold ion was supported on ZSM-5 zeolite carrier particles (MFI) (Si/Al ratio: 1,500) by ion exchange, and then gold clusters were supported on the zeolite carrier particle by reducing the gold ion (ion exchange-reduction method). Chloroauric acid ($HAuCl_4$) was used as a gold ion source and $NaBH_4$ was used as a reducing agent.

<Evaluation: Overall Composition Evaluation (ICP-OES)>

With respect to the supported catalysts of Example 14 and Comparative Example 6, the elemental composition of the supported catalyst as a whole was evaluated using inductively coupled plasma spectrometer (ICP-OES apparatus) (Agilent 5100 manufactured by Agilent Technologies, Inc. and SPS3000 manufactured by Hitachi High-Tech Science Corporation). The results are shown in Table 2 below.

<Evaluation: Surface Composition Evaluation (TEM-EDX)>

With respect to the supported catalysts of Example 14 and Comparative Example 6, the elemental composition of the supported catalyst surface was evaluated using a transmission electron microscope-energy dispersive X-ray spectroscopy (TEM-EDX) (JEM-2100F and JED-2300, manufactured by JEOL Ltd.). The results are shown in Table 2 below.

TABLE 2

|  |  | Example 14 (Au laser ablation/ MFI(1500)) | Comparative Example 6 (Au ion change-reduction/ MFI(1500)) |
|---|---|---|---|
| Whole (ICP-MASS) | Au (wt %) | 0.015 | 0.005 |
|  | Si (wt %) | 38 | 41 |
|  | Au/Si | 3.95 × 10⁻⁴ | 1.22 × 10⁻⁴ |
| Surface (TEM-EDX) | Au (wt %) | 0.46 | 0.44 |
|  | Si (wt %) | 66.94 | 59.82 |
|  | Au/Si | 6.87 × 10⁻³ | 7.36 × 10⁻³ |
| Heterogeneity index | (Au/Si (surface))/ (Au/Si (whole)) | 17.39 | 60.33 |

It is understood from Table 2 that in the supported catalyst of Example 14 obtained by the method of laser ablation in liquid, compared with the supported catalyst of Comparative Example 6 obtained by the ion exchange-reduction method, the ratio of the proportion of gold element in the whole to the proportion of gold element in the surface is small, i.e., the gold clusters are relatively uniformly dispersed in the supported catalyst.

Example 15 and Comparative Example 7

In Example 15 and Comparative Example 7, rhodium cluster-supporting catalysts were obtained by using a method of laser ablation in liquid and an ion exchange-reduction method, respectively.

Example 15

In Example 15, rhodium clusters were supported on a zeolite carrier particle by a method of laser ablation in liquid in the same manner as in Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Comparative Example 7

In Comparative Example 7, a rhodium ion was supported on ZSM-5 zeolite carrier particles (Si/Al ratio: 40) by ion exchange, and then a metallic rhodium particle was supported on the zeolite carrier particle by reducing the rhodium ion, whereby rhodium clusters were supported on the zeolite carrier particle (ion exchange-reduction method). $Rh(NO_3)_3$ was used as a rhodium ion source and $NaBH_4$ was used as a reducing agent. The amount of rhodium supported was 0.051 mass % relative to the zeolite carrier particle.

<Evaluation: $H_2$-TPR Test (Before Thermal Endurance)>

With respect to the supported catalysts of Example 15 and Comparative Example 7, a pretreatment was performed by adsorbing oxygen to the supported catalyst at 30° C. for 1 hour in a 100 vol % oxygen atmosphere and removing excess oxygen at 500° C. for 1 hour in a helium atmosphere.

With respect to the supported catalysts above subjected to the pretreatment, a test by hydrogen temperature-programmed reduction method ($H_2$-TPR) was performed by flowing a reducing gas containing 0.5 vol % of hydrogen and the balance helium at a spatial velocity of 10,000 h⁻¹ while raising the temperature at a rate of 10° C./min from 20° C.

Figure 13A:
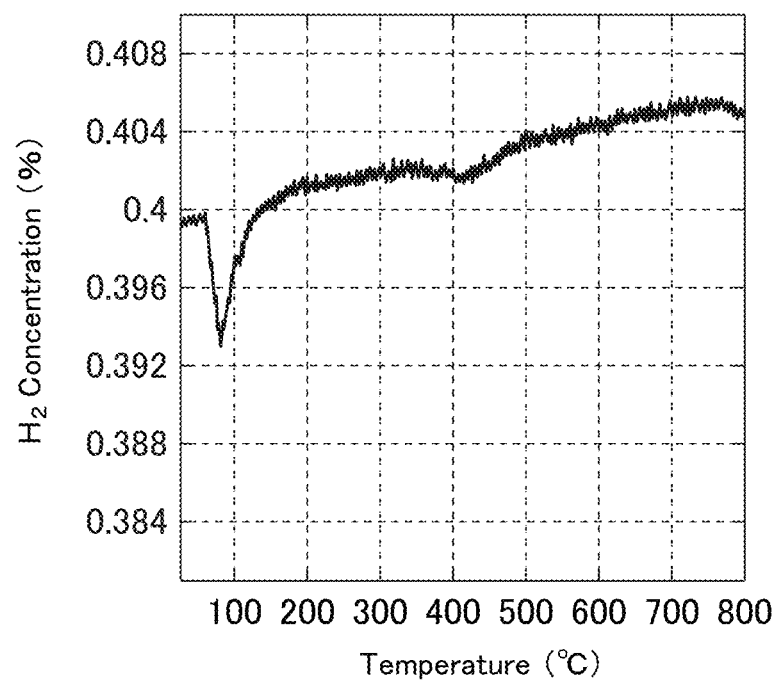
FIG. 13 depicts graphs illustrating the results of a test by hydrogen temperature-programmed reduction method ($H_2$-TPR) with respect to the rhodium cluster-supporting catalyst of Example 15 prepared by a method of laser ablation in liquid.
Figure 13B:
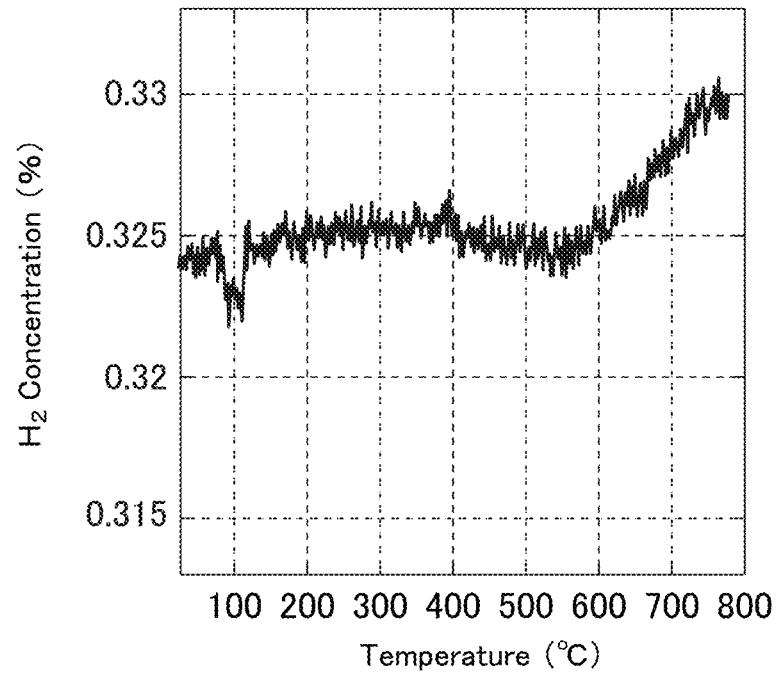
Figure 14A:
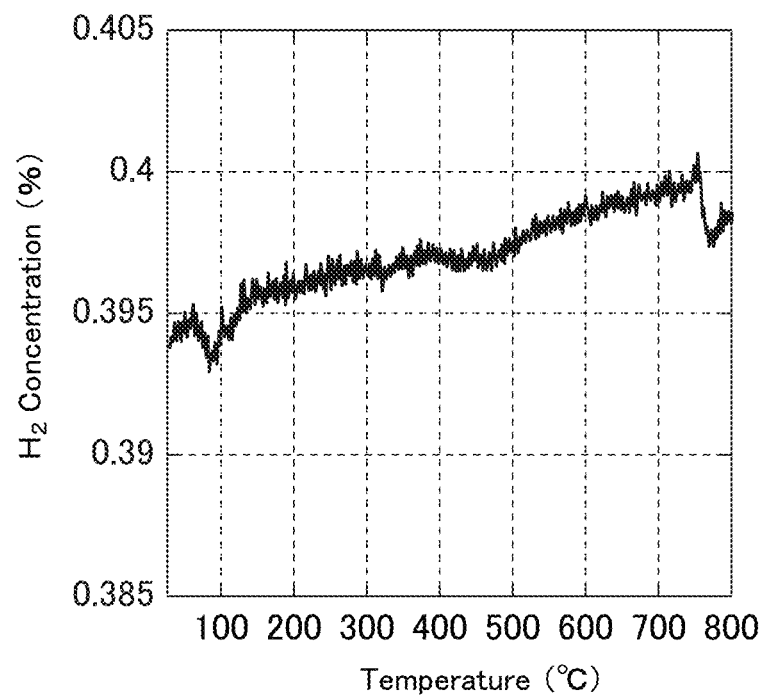
FIG. 14 depicts graphs illustrating the results of a $H_2$-TPR test with respect to the rhodium cluster-supporting catalyst of Comparative Example 7 prepared by an ion exchange-reduction method.

The result as to the supported catalyst of Example 15 is illustrated in FIG. 13A, and the result as to the supported catalyst of Comparative Example 7 is illustrated in FIG. 14A. The peak/noise ratio of the peak indicated by an arrow of FIG. 13A was 35.7 (noise level: 0.000215%), and the peak/noise ratio of the peak indicated by an arrow of FIG. 13B was 5.12 (noise level: 0.000394%).

It is understood from these graphs that both of the supported catalysts of Example 15 and Comparative Example 7 have a relatively large peak of reaction between hydrogen supplied and oxygen adsorbed to the cluster-supporting catalyst, i.e., a peak with a peak/noise ratio of 2.0 or more, in the temperature range of 150° C. or less, i.e., have low-temperature activity.

<Evaluation: $H_2$-TPR Test (after Thermal Endurance)>

With respect to the supported catalysts of Example 15 and Comparative Example 7, a thermal endurance treatment was performed by subjecting the supported catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

With respect to the supported catalysts above subjected to the thermal endurance treatment, a pretreatment was performed as described above.

With respect to the supported catalysts above subjected to the pretreatment, a $H_2$-TPR test was performed as described above.

Figure 14B:
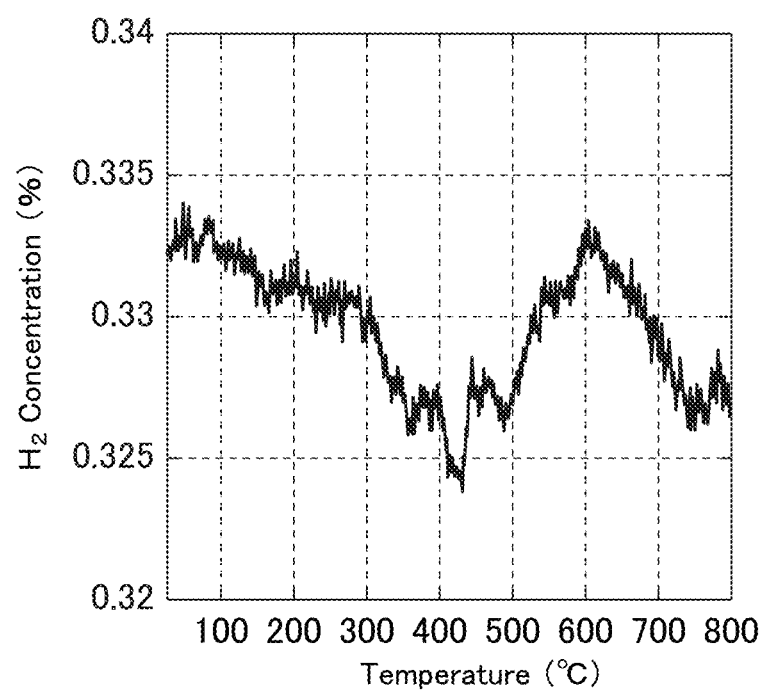

The result as to the supported catalyst of Example 15 is illustrated in FIG. 13B, and the result as to the supported catalyst of Comparative Example 7 is illustrated in FIG. 14B. The peak/noise ratio of the peak indicated by an arrow of FIG. 14A was 7.76 (noise level: 0.000326%), and the peak/noise ratio of the peak indicated by an arrow of FIG. 14B was 1.62 (noise level: 0.000377%).

It is understood from FIG. 13B that the supported catalyst of Example 15 has a relatively large reaction peak in the temperature range of 150° C. or less, i.e., has low-temperature activity. In addition, it is understood from FIG. 14B that the supported catalyst of Comparative Example 7 does not have a substantial peak in the temperature range of 150° C. or less, i.e., does not have a peak with a peak/noise ratio of 2.0 or more. In this way, the supported catalyst of Comparative Example 7 does not have a substantial peak in the temperature range of 150° C. or less, and this means that the supported catalyst does not have low-temperature activity. That is, it is understood that in the supported catalyst of Comparative Example 7 obtained by the ion exchange-reduction method, the dispersibility of the cluster particle was low and in turn, the heat resistance was poor.

Example 16 and Comparative Example 8

In Example 16 and Comparative Example 8, palladium cluster-supporting catalysts were obtained by using a method of laser ablation in liquid and an ion exchange-reduction method, respectively.

Example 16

In Example 16, palladium clusters were supported on a zeolite carrier particle by a method of laser ablation in liquid in the same manner as in Example 1 except that a palladium target was used in place of the gold target and ZSM-5 zeolite carrier particles (Si/Al ratio: 40) were used as the zeolite carrier particle. The amount of palladium supported was 0.09 mass % relative to the zeolite carrier particle.

Comparative Example 8

In Comparative Example 8, a palladium ion was supported on ZSM-5 zeolite carrier particles (Si/Al ratio: 40) by ion exchange, and then a metallic palladium particle was supported on the zeolite carrier particle by reducing the palladium ion, whereby palladium clusters were supported on the zeolite carrier particle (ion exchange-reduction method). $Pd(NH_3)_4Cl_2 \cdot H_2O$ (tetraamminepalladium(II) chloride monohydrate) was used as a palladium ion source and $NaBH_4$ was used as a reducing agent. The amount of palladium supported was 0.86 mass % relative to the zeolite carrier particle.

<Evaluation: Carbon Monoxide Oxidation Test>

With respect to the supported catalysts of Example 16 and Comparative Example 8, a thermal endurance treatment was performed by subjecting the supported catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

A model gas containing 0.3 vol % of carbon monoxide, 8.0 vol % of oxygen and the balance helium was flowed at a spatial velocity of 10,000 $h^{-1}$ over the supported catalysts subjected to the thermal endurance treatment, and the number of molecules of the carbon monoxide molecule capable of being oxidized to carbon dioxide molecule by one palladium atom at a temperature of 100° C. in the temperature dropping process was evaluated by performing a temperature rising process of raising the temperature at a rate of 10° C./min to 800° C. from room temperature and then performing a temperature dropping process of lowering the temperature to room temperature.

The number of molecules can be obtained by dividing the molar number of the carbon dioxide molecule in the model gas flowing per second after reaction by the molar number of palladium as a catalyst metal in the supported catalyst.

Figure 15:
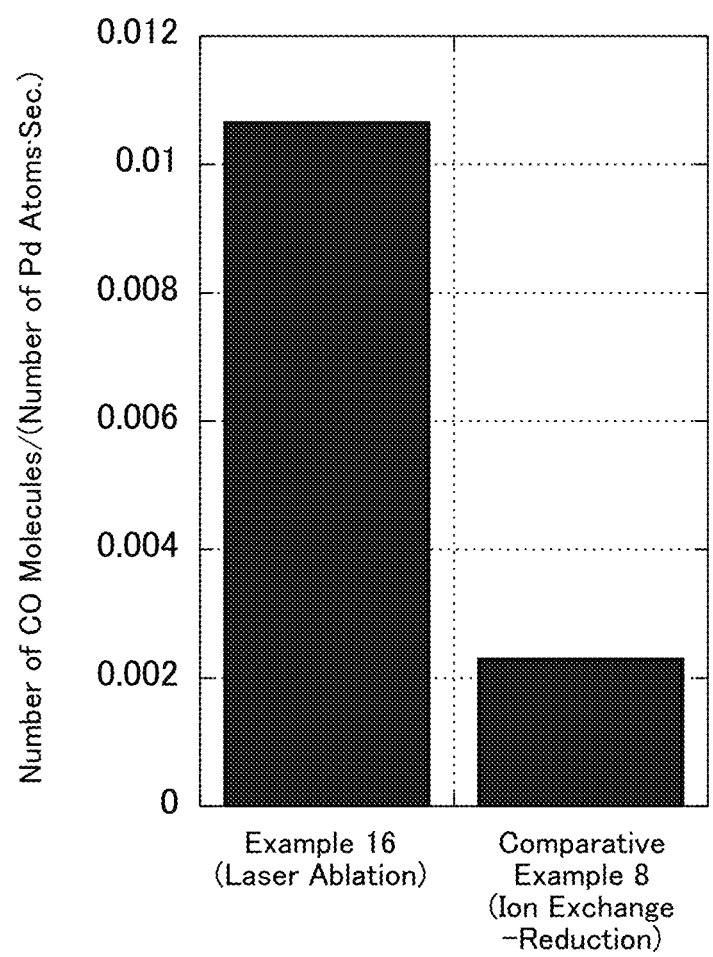
FIG. 15 is a graph illustrating the results of a carbon monoxide oxidation test with respect to the palladium cluster-supporting catalysts of Example 16 prepared by a method of laser ablation in liquid and Comparative Example 8 prepared by an ion exchange-reduction method.

The results as to the supported catalysts of Example 16 and Comparative Example 8 are illustrated in FIG. 15. It is seen from FIG. 15 that in the supported catalyst of Example 16 obtained by the laser ablation method, the number of molecules of the carbon monoxide molecule capable of being oxidized to carbon dioxide molecule by one palladium atom was near 0.008 and on the other hand, in the supported catalyst of Comparative Example 8 obtained by the ion exchange-reduction method, the number did not reach 0.002. This indicates that in the supported catalyst of Comparative Example 8 obtained by the ion exchange-reduction method, the dispersibility of the cluster particle was low and in turn, the heat resistance was poor.

Example 17 and Comparative Example 9

In Example 17 and Comparative Example 9, platinum cluster-supporting catalysts were obtained by using a method of laser ablation in liquid and an ion exchange-reduction method, respectively.

Example 17

In Example 17, platinum clusters were supported on a zeolite carrier particle by a method of laser ablation in liquid in the same manner as in Example 1 except that a platinum target was used in place of the gold target and ZSM-5 zeolite carrier particles (Si/Al ratio: 40) were used as the zeolite carrier particle. The amount of platinum supported was 1.1 mass % relative to the zeolite carrier particle.

Comparative Example 9

In Comparative Example 9, a platinum ion was supported on ZSM-5 zeolite carrier particles (Si/Al ratio: 40) by ion exchange, and then a metallic platinum particle was supported on the zeolite carrier particle by reducing the platinum ion, whereby platinum clusters were supported on the zeolite carrier particle (ion exchange-reduction method). $Pt(NH_3)_4Cl_2 \cdot xH_2O$ (tetraammineplatinum(II) chloride monohydrate) was used as a platinum ion source and $NaBH_4$ was used as a reducing agent. The amount of platinum supported was 1.9 mass % relative to the zeolite carrier particle.

<Evaluation: Carbon Monoxide Oxidation Test>

With respect to the supported catalysts of Example 17 and Comparative Example 9, a thermal endurance treatment was performed by subjecting the supported catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

A model gas containing 0.3 vol % of carbon monoxide, 8.0 vol % of oxygen and the balance helium was flowed at a spatial velocity of 10,000 $h^{-1}$ over the supported catalysts subjected to the thermal endurance treatment, and the number of molecules of the carbon monoxide molecule capable of being oxidized to carbon dioxide molecule by one platinum atom at a temperature of 60° C. in the temperature dropping process was evaluated by performing a temperature rising process of raising the temperature at a rate of 10° C./min to 800° C. from room temperature and then performing a temperature dropping process of lowering the temperature to room temperature.

Figure 16:
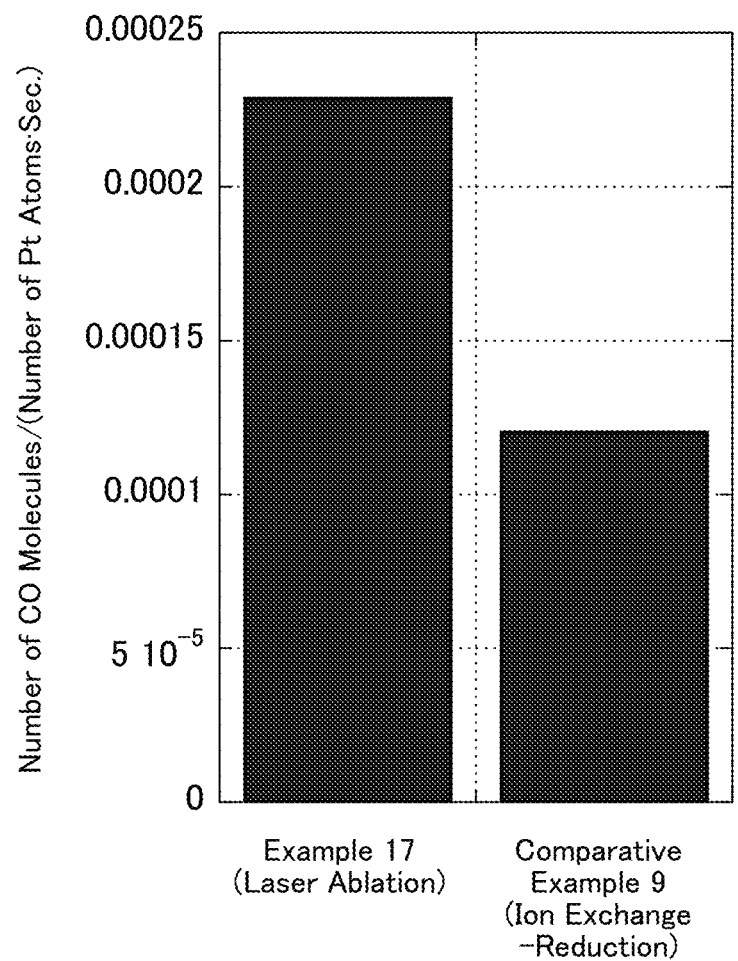
FIG. 16 is a graph illustrating the results of a carbon monoxide oxidation test with respect to the platinum cluster-supporting catalysts of Example 17 prepared by a method of laser ablation in liquid and Comparative Example 9 prepared by an ion exchange-reduction method.

The results as to the supported catalysts of Example 17 and Comparative Example 9 are illustrated in FIG. 16. It is seen from FIG. 16 that in the supported catalyst of Example 17 obtained by the laser ablation method, the number of molecules of the carbon monoxide molecule capable of being oxidized to carbon dioxide molecule by one platinum atom was near 0.0002 and on the other hand, in the supported catalyst of Comparative Example 9 obtained by the ion exchange-reduction method, the number did not reach 0.0001. This indicates that in the supported catalyst of Comparative Example 9 obtained by the ion exchange-reduction method, the dispersibility of the cluster particle was low and in turn, the heat resistance was poor.

Example 18 and Comparative Example 10

In Example 18 and Comparative Example 10, supported copper-cluster catalysts were obtained by using a method of laser ablation in liquid and an ion exchange-reduction method, respectively.

Example 18

In Example 18, copper clusters were supported on a zeolite carrier particle by a method of laser ablation in liquid in the same manner as in Example 1 except that a copper target was used in place of the gold target and a chavazite (CHA)-type zeolite carrier particle were used as the zeolite carrier particle. The amount of copper supported was 0.9 mass % relative to the zeolite carrier particle.

Comparative Example 10

In Comparative Example 10, a copper ion was supported on a chavazite (CHA)-type zeolite carrier particle by ion exchange, and then a metallic copper particle was supported on the zeolite carrier particle by reducing the copper ion, whereby copper clusters were supported on the zeolite carrier particle (ion exchange-reduction method). Copper nitrate was used as a copper ion source and $NaBH_4$ was used as a reducing agent. The amount of copper supported was 0.9 mass % relative to the zeolite carrier particle.

<Evaluation: Nitric Oxide Temperature-Programmed Desorption Test>

With respect to the supported catalysts of Example 18 and Comparative Example 10, nitric oxide was adsorbed to the supported catalyst through heating at 800° C. for 1 hour in an atmosphere containing 10 vol % of oxygen and the balance helium, heating at 800° C. for 30 minutes in an atmosphere containing 100 vol % of helium, lowering of the ambient temperature to 25° C., holding for 1 hour in an atmosphere containing 500 ppm by volume of nitric oxide and the balance helium, and holding for 1 hour in an atmosphere containing 100 vol % of helium.

The supported catalyst having adsorbed thereto nitric oxide was heated at a temperature rise rate of 10° C./min to 800° C. in an atmosphere containing 100 vol % of helium, and the amount of nitric oxide desorbed during the heating was detected by a mass spectrometer to obtain a nitric oxide temperature-programmed desorption spectrum. Incidentally, the gas flow rate in the atmosphere was 10 sccm in all cases.

Figure 17A:
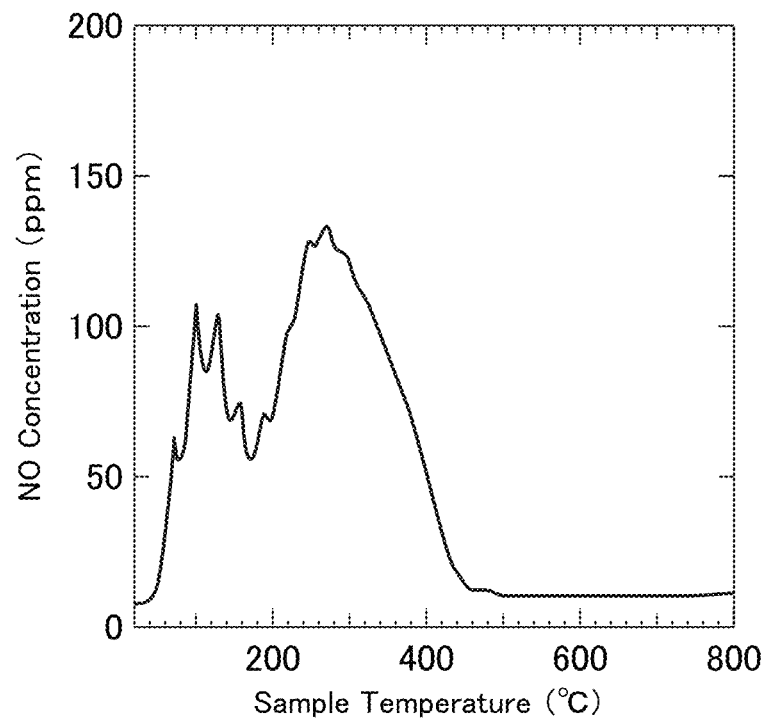
FIG. 17 depicts graphs illustrating the results of a nitric oxide temperature-programmed desorption test with respect to the supported copper-cluster catalysts of Example 18 prepared by a method of laser ablation in liquid and Comparative Example 10 prepared by an ion exchange-reduction method.
Figure 17B:
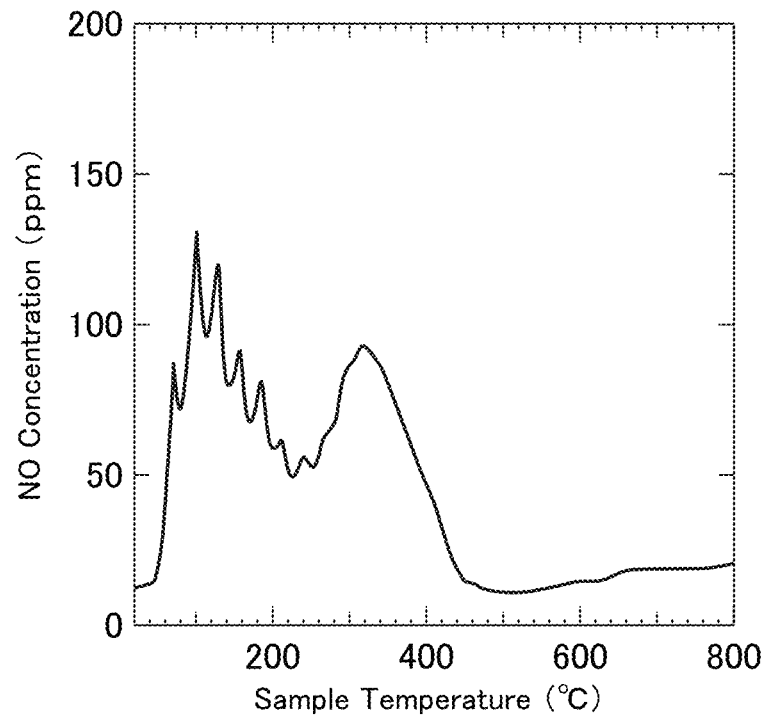

The results as to the supported catalysts of Example 18 and Comparative Example 10 are illustrated in FIGS. 17A and 17B, respectively.

It is revealed from FIG. 17A that in the supported catalyst of Example 18 obtained by the laser ablation method, the maximum peak in the range of 200 to 400° C. is present at about 270° C. On the other hand, it is revealed from FIG. 17B that in the supported catalyst of Comparative Example 10 obtained by the ion exchange-reduction method, the maximum peak in the range of 200 to 400° C. is present at about 320° C. A sharp peak observed at a temperature of about 200° C. or less is thought of as a measurement error due to fluctuation of the measurement temperature.

The difference in the temperature between maximum peaks illustrated in FIGS. 17A and 17B indicates that the supported catalyst of Example 18 obtained by the laser ablation method and the supported catalyst of Comparative Example 10 obtained by the ion exchange-reduction method have different structures from each other.

Example 19 and Comparative Example 11

In Example 19 and Comparative Example 11, platinum cluster-supporting catalysts were obtained by using an positive-negative inversion method and an ion exchange-reduction method, respectively.

Example 19

In Example 19, zeolite MFI(40) was added to 200 ml of an aqueous solution containing 10 mM of $H_2[PtCl_6]$ in pure water, a pulsed laser is converged and introduced into this aqueous solution to decompose $H_2[PtCl_6]$ and produce a positively charged platinum cluster, and the positively charged platinum clusters were supported on the acid sites of zeolite through an electrostatic interaction.

Comparative Example 11

In Comparative Example 11, $H_2[PtCl_6]$ in pure water was supported on zeolite MFI(40) by ion exchange. The amount of platinum supported was 0.003 mass % relative to the zeolite carrier particle.

<Evaluation: Fluorescence Spectrum>

Figure 18:
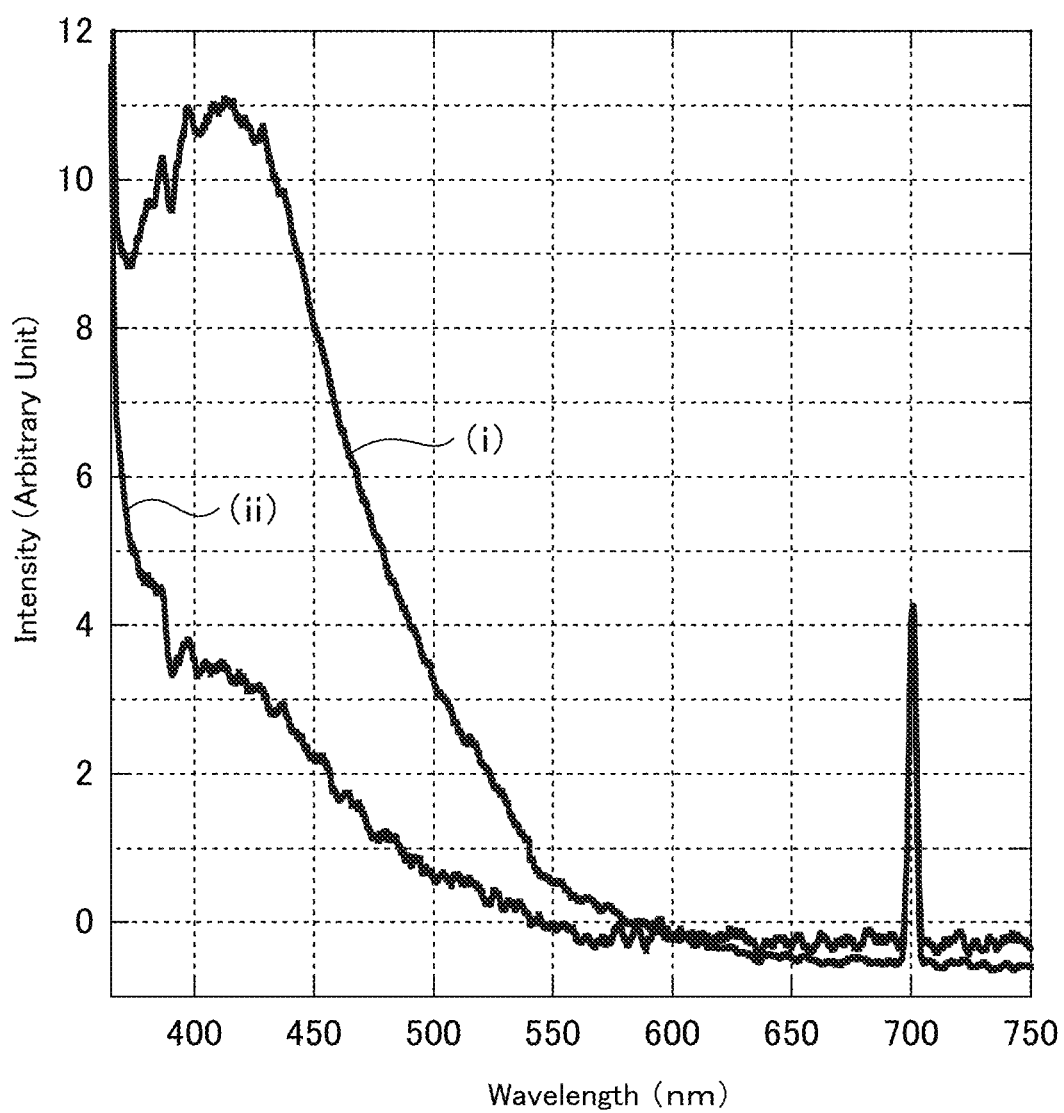
FIG. 18 is a graph illustrating the fluorescence spectra with respect to the platinum cluster-supporting catalysts of Example 19 prepared by a positive-negative inversion method and Comparative Example 11 prepared by an ion exchange-reduction method.

The platinum cluster-supporting catalysts of Example 19 and Comparative Example 11 were measured for the fluorescence spectrum (excitation wavelength: 350 nm). The evaluation results of fluorescence spectrum are illustrated in FIG. 18. In FIG. 18, the results as to Example 18 is indicated by the spectrum (i), and the result as to Comparative Example 11 is indicated by the spectrum (ii).

In FIG. 18, the fluorescence signal at near 410 nm is a spectrum in which fluorescent emissions from the gold cluster of about tetramer were overlapped. Accordingly, FIG. 18 reveals that in the platinum cluster-supporting catalyst of Example 18, a relatively large amount of a platinum cluster around tetramer is supported on the carrier particle and on the other hand, in the supported-platinum catalyst of Comparative Example 11, such clusters are not present in a significant manner.

Example 20 and Comparative Example 12

In Example 20 and Comparative Example 12, rhodium cluster-supporting catalysts were obtained by using a method of laser ablation in liquid and an ion exchange-reduction method, respectively.

Example 20

In Example 20, rhodium clusters were supported on a zeolite carrier particle by a method of laser ablation in liquid in the same manner as in Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Comparative Example 12

In Comparative Example 12, a rhodium ion was supported on ZSM-5 zeolite carrier particles (Si/Al ratio: 40) by ion exchange, and then rhodium clusters were supported on the zeolite carrier particle by reducing the rhodium ion. $Rh(NO_3)_3$ was used as a rhodium ion source and $NaBH_4$ was used as a reducing agent. The amount of rhodium supported was 0.051 mass % relative to the zeolite carrier particle.

<Evaluation: Nitric Oxide Reduction Test>

A thermal endurance treatment was performed by heating the supported catalyst for 1 hour in an atmosphere at 800° C. containing 8 vol % of oxygen, 0.3 vol % of carbon monoxide and the balance helium.

A model gas containing 0.1 vol % of $^{15}NO$, 0.65 vol % of CO and the balance helium was flowed at a spatial velocity of 10,000 $h^{-1}$ over the supported catalysts subjected to the thermal endurance treatment, and the nitric oxide reduction reaction was measured by raising the temperature at a rate of 10° C./min to 800° C. from room temperature (temperature rising process) and then lowering the temperature to room temperature (temperature dropping process).

Figure 19A:
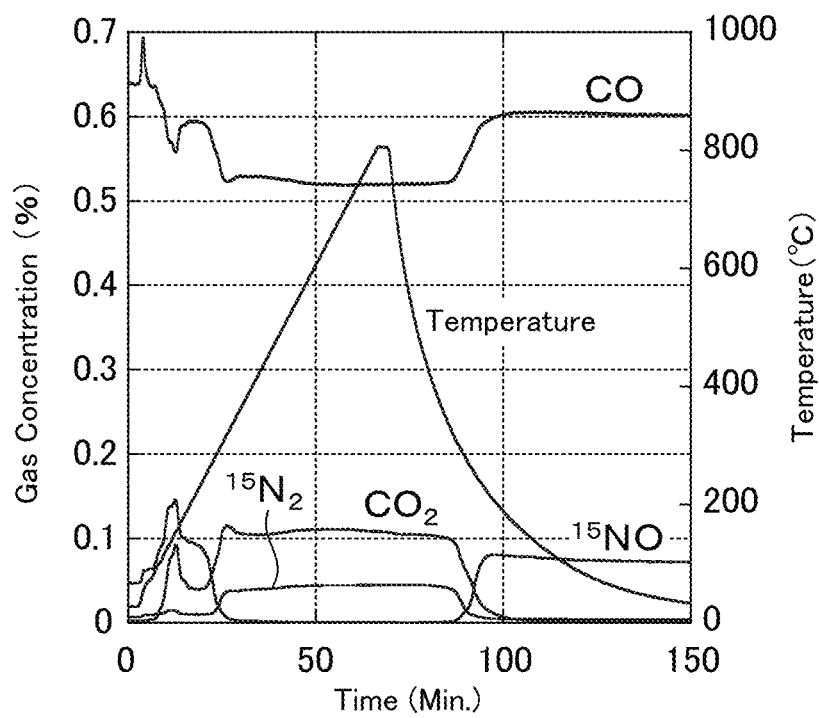
FIG. 19 depicts graphs illustrating the nitric oxide reduction test results (gas composition) with respect to the rhodium cluster-supporting catalysts of Example 20 prepared by a method of laser ablation in liquid and Comparative Example 12 prepared by an ion exchange-reduction method.
Figure 19B:
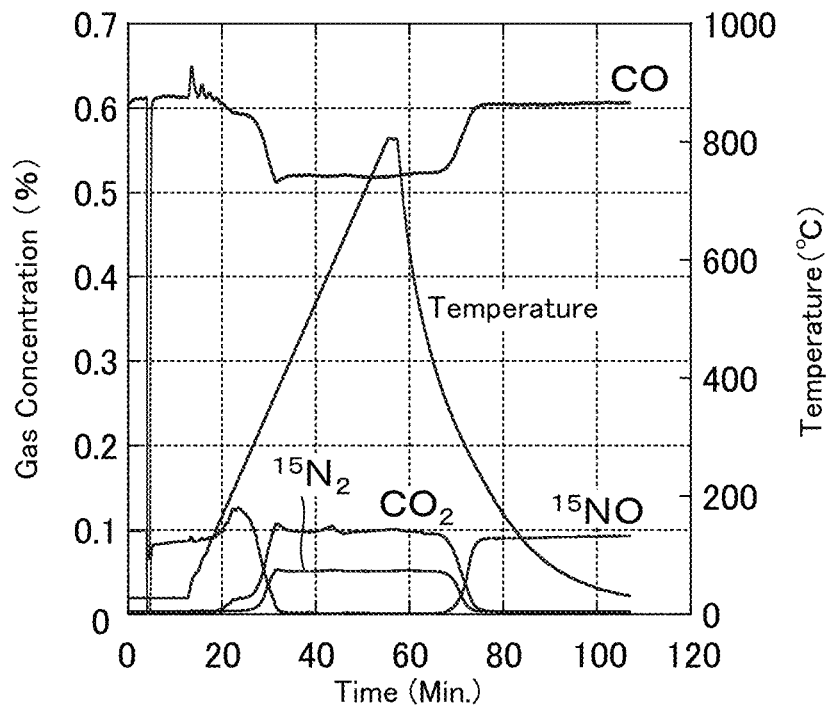

With respect to the concentration change of each component due to the nitric oxide reduction, the evaluation result as to the catalyst of Example 20 is illustrated in FIG. 19A, and the evaluation result as to the catalyst of Comparative Example 12 is illustrated in FIG. 19B.

In FIGS. 19A and 19B, a peak of nitrogen oxide appears in the range of 100 to 200° C., and this is a concentration rise due to desorption of nitric oxide adsorbed to the catalyst. When the reaction temperature further rises, the concentration of nitric oxide decreases, and a reaction of reducing nitric oxide ($^{15}NO$) by carbon monoxide (CO) to produce nitrogen ($N_2$) starts.

In the catalyst of Example 20, the reaction temperature at the time of half of the nitric oxide supplied being reduced into nitrogen, i.e., the reaction temperature at the time of the nitrogen concentration becoming 0.05 vol %, is about 272° C. in the temperature rising process and 254° C. in the temperature dropping process, whereas in the catalyst of Comparative Example 12, the reaction temperature was about 321° C. in the temperature rising process and 279° C. in the temperature dropping process. It is therefore revealed that the catalyst of Example 20 obtained by the method of laser ablation in liquid has excellent low-temperature activity, compared with the catalyst of Comparative Example 12 obtained by the ion exchange-reduction method.

Figure 20:
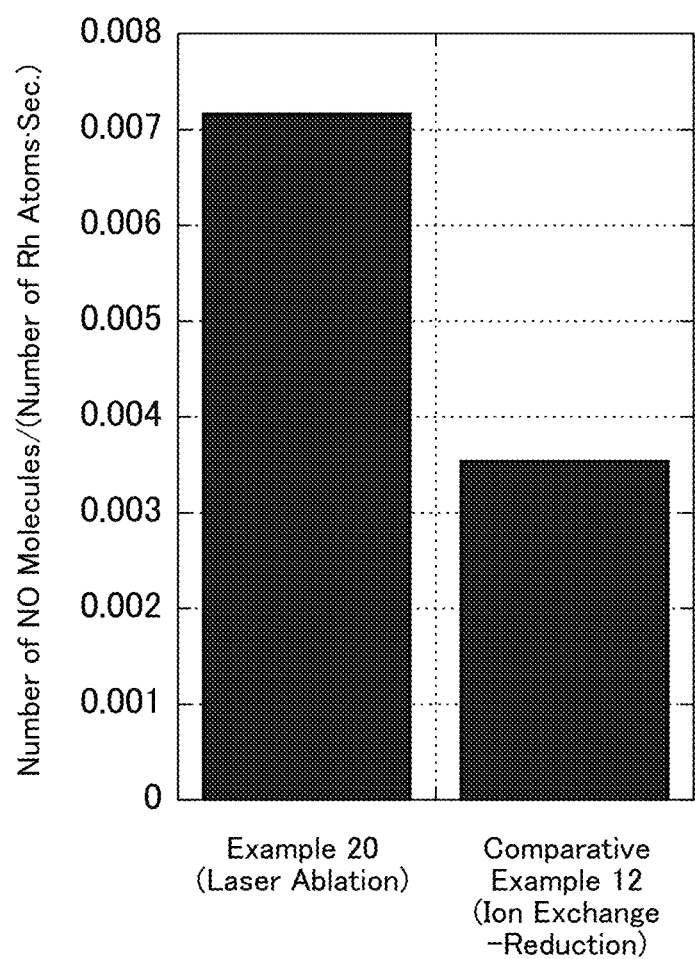
FIG. 20 is a graph illustrating the nitric oxide reduction test results with respect to the rhodium cluster-supporting catalysts of Example 20 prepared by a method of laser ablation in liquid and Comparative Example 12 prepared by an ion exchange-reduction method.

The evaluation results of the number of molecules of the nitric oxide molecule capable of being reduced to nitrogen by one rhodium atom at a temperature of 250° C. in the temperature dropping process are illustrated in FIG. 20.

FIG. 20 reveals that in the supported catalyst of Example 20 obtained by the laser ablation method, the number of molecules of nitrogen monoxide molecule capable of being purified in 1 second by one rhodium atom exceeded 0.007 and on the other hand, in the catalyst of Comparative Example 12 obtained by the ion exchange-reduction method, the number did not reach 0.004. It is therefore apparent that the catalyst of Example 20 obtained by the laser ablation method has excellent low-temperature activity, compared with the catalyst of Comparative Example 12 obtained by the ion exchange-reduction method.

Examples 21 and 22 and Comparative Example 13

In Examples 21 and 22, a platinum cluster-supporting catalyst and a rhodium cluster-supporting catalyst were obtained respectively by using a method of laser ablation in liquid. In Comparative Example 13, a general three-way catalyst in which platinum, rhodium and palladium are supported on a mixed powder of alumina carrier particles and ceria-zirconia carrier particles was used.

Example 21

In Example 21, platinum clusters were supported on a zeolite carrier particle by a method of laser ablation in liquid in the same manner as in Example 1 except that a platinum target was used in place of the gold target and ZSM-5 zeolite carrier particles (Si/Al ratio: 40) were used as the zeolite carrier particle. The amount of platinum supported was 0.59 mass % relative to the zeolite carrier particle.

Example 22

In Example 22, rhodium clusters were supported on a zeolite carrier particle by a method of laser ablation in liquid in the same manner as in Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Comparative Example 13

In Comparative Example 13, a general three-way catalyst in which platinum, rhodium and palladium are supported on a mixed powder of alumina carrier particles and ceria-zirconia carrier particles was used. The amounts of platinum, rhodium and palladium supported were 0.2 mass %, 0.19 mass % and 0.25 mass %, respectively, relative to the carrier powder.

<Evaluation: Oxygen Oxidation Reaction Test of Adsorbed Carbon Monoxide>

The catalysts of Examples 21 and 22 and Comparative Example 13 were held at 800° C. for 1 hour in an atmosphere containing 500 ppm by volume of carbon monoxide and the balance helium to adsorb carbon monoxide to the supported catalyst, and then an oxygen oxidation reaction test of adsorbed carbon monoxide was performed by heating the supported catalyst having adsorbed thereto carbon monoxide at a temperature rise rate of 10° C./min to 800° C. in an atmosphere containing 10 vol % of oxygen and the balance helium. During these treatments, the spatial velocity was 10,000 $h^{-1}$.

In addition, the catalysts of Examples 21 and 22 and Comparative Example 13 were cleaned by performing the following treatments (i) to (iv):

(i) putting the catalyst at a concentration of 4 mass % in an aqueous 1 M sodium chloride solution, followed by stirring at 80° C. for 10 days, (ii) after (i) above, rinsing the catalyst with ion-exchanged water, (iii) after (ii) above, putting the catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water.

The catalysts of Examples 21 and 22 and Comparative Example 13 subjected to the cleaning treatment were subjected to the above-described oxygen oxidation reaction test of adsorbed carbon monoxide.

Figure 21:
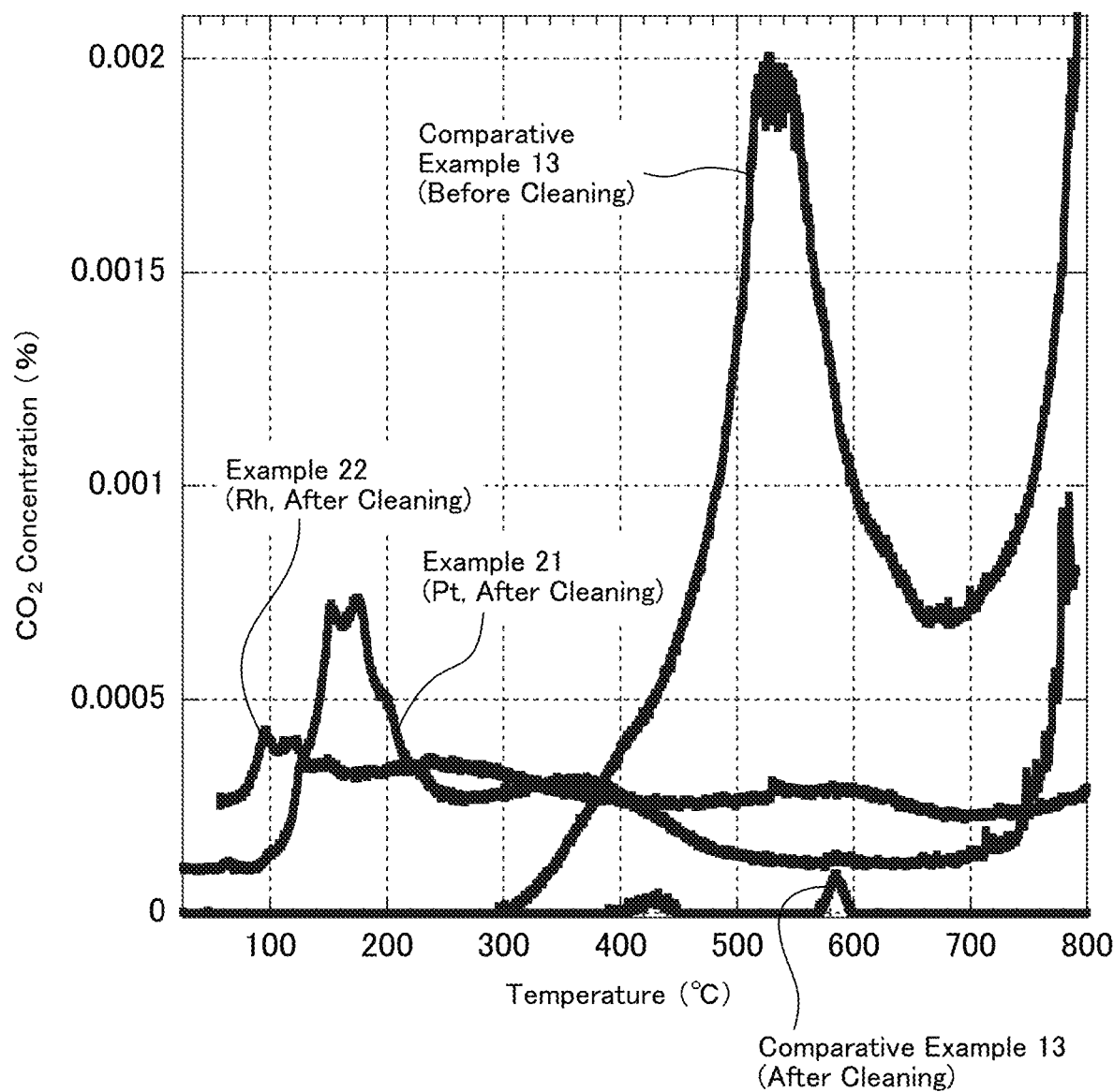
FIG. 21 is a graph illustrating the results of an oxygen oxidation reaction test of adsorbed carbon monoxide after cleaning treatment with respect to the platinum cluster-supporting catalyst of Example 21 prepared by a method of laser ablation in liquid and the rhodium cluster-supporting catalysts of Example 22 prepared by a method of laser ablation in liquid, and the results of an oxygen oxidation reaction test of adsorbed carbon monoxide before and after cleaning treatment with respect to a general three-way catalyst.

With respect to the catalysts of Examples 21 and 22 and Comparative Example 13, the results of the oxygen oxidation reaction test of adsorbed carbon monoxide before and after the cleaning treatment are illustrated in FIG. 21.

As apparent from FIG. 21, in the catalysts of Examples 21 and 22 obtained by the method of laser ablation in liquid, a signal on the low temperature side of 200° C. or less was present before and after the cleaning treatment, whereas in the catalyst of Comparative Example 13 that is a general three-way catalyst, the difference in the evaluation result between before and after the cleaning treatment was large and a signal on the low temperature side of 200° C. or less was not observed.

This is considered to be attributable to the fact that in the catalysts of Examples 21 and 22 obtained by the method of laser ablation in liquid, the catalyst metal clusters was supported within the pores of zeolite and the catalyst metal clusters was thereby not lost even by cleaning, whereas in the general three-way catalyst, the catalyst metal particles were supported on the outer surface of the carrier particle and consequently, the catalyst metal particles were lost by cleaning.

DESCRIPTION OF NUMERICAL REFERENCES

11 Acetone as dispersion medium
12 Plate of gold
13 Vessel 13
14 Lens 14
15 Laser
16 Gold cluster
20 Zeolite carrier particle

The invention claimed is:

1. A method for producing a cluster-supporting catalyst,
wherein the cluster-supporting catalyst comprises porous carrier particles having acid sites, and catalyst metal clusters supported within the pores of the porous carrier particles; and
wherein the method comprises the followings steps:
providing a dispersion liquid containing a dispersion medium and the porous carrier particles dispersed in the dispersion medium, and
forming, in the dispersion liquid, catalyst metal clusters having a positive charge, and supporting the catalyst metal clusters on the acid sites within the pores of the porous carrier particles through an electrostatic interaction.

2. The method according to claim 1, wherein the dispersion liquid is provided by pulverizing the porous carrier particles, and dispersing the pulverized porous carrier particles in the dispersion medium.

3. The method according to claim 1, wherein the step of forming the catalyst metal clusters in the dispersion liquid comprises at least one of:
performing laser ablation in liquid,
performing microwave ablation in liquid,
performing plasma ablation in liquid, and
performing a positive-negative inversion.

4. The method according to claim 1, wherein the step of forming the catalyst metal clusters in the dispersion liquid comprises performing a reduction reaction in liquid.

5. A method for producing a cluster-supporting catalyst,
wherein the cluster-supporting catalyst comprises porous carrier particles having acid sites, and catalyst metal clusters supported within the pores of the porous carrier particles; and
wherein the method comprises the followings steps:
providing a dispersion liquid containing a dispersion medium and the porous carrier particles dispersed in the dispersion medium,
forming, in the dispersion liquid, catalyst metal clusters having a positive charge via a reduction reaction during which the dispersion liquid is irradiated with plasma and/or microwave to promote the reduction of an ion of the catalyst metal by a reducing agent, and
supporting the catalyst metal clusters on the acid sites within the pores of the porous carrier particles through an electrostatic interaction.

6. The method according to claim 1, wherein the dispersion medium of the dispersion liquid is an organic solvent.

* * * * *